July 29, 1969 G. A. GARRY ET AL 3,458,688

DOCUMENT LINE POSITION IDENTIFICATION FOR LINE MARKING AND DOCUMENT INDEXING APPARATUS

Filed Aug. 9, 1965 20 Sheets-Sheet 1

INVENTORS
GERALD A. GARRY
DONALD J. KOSTUCH
FREDERICK W. LAWLESS
DAVEY L. MALABY

BY Donald F Voss

ATTORNEY

July 29, 1969 G. A. GARRY ET AL 3,458,688

DOCUMENT LINE POSITION IDENTIFICATION FOR LINE MARKING AND DOCUMENT INDEXING APPARATUS

Filed Aug. 9, 1965 20 Sheets-Sheet 8

July 29, 1969 G. A. GARRY ET AL 3,458,688

DOCUMENT LINE POSITION IDENTIFICATION FOR LINE MARKING AND DOCUMENT INDEXING APPARATUS

Filed Aug. 9, 1965 20 Sheets-Sheet 14

July 29, 1969 G. A. GARRY ET AL 3,458,688

DOCUMENT LINE POSITION IDENTIFICATION FOR LINE MARKING AND DOCUMENT INDEXING APPARATUS

Filed Aug. 9, 1965 20 Sheets-Sheet 20

United States Patent Office 3,458,688

Patented July 29, 1969

3,458,688

DOCUMENT LINE POSITION IDENTIFICATION FOR LINE MARKING AND DOCUMENT INDEXING APPARATUS

Gerald A. Garry and Donald J. Kostuch, Rochester, Minn., Frederick W. Lawless, Huntsville, Ala., and Davey L. Malaby, Rochester, Minn., assignors to International Business Machines Corporation, Armonk, N.Y., a corporation of New York Filed Aug. 9, 1965, Ser. No. 478,368

Int. Cl. G06k *1/00, 7/00*

U.S. Cl. 235—61.7 13 Claims

ABSTRACT OF THE DISCLOSURE

Apparatus is provided for randomly identifying the spatial positions of lines of information on a document. The line identification data is used to facilitate document indexing and for marking lines containing information which could not be read. A line identification track is referenced to the document and contains scannable marks which divide the document into incremental areas and which enable each incremental area to be identified independently. The lines of information are identified in terms of the incremental area immediately above a line and the distance that the line is away from this incremental area. The beam of a flying spot scanner used for scanning the document for information is selectively directed into the line identification track. It is then moved upwardly, and as it moves, a distance measurement is made from the place of entry to the lower mark of the immediately above incremental area. The beam continues to move upwardly until it reaches a mark defining the extremity of the incremental area. It is then reversed and returned to the place of entry. As the beam moves within the incremental area, the marks identifying the area are sensed. The line identification data is stored so as to be available for document indexing and line marking.

This invention relates to apparatus for identifying lines on documents to facilitate document indexing and selective marking of lines on the documents.

Synchronously operated document handling machines, generally speaking, have no real requirement for document line identification. This is because the lines on the document can always be related to some reference, such as a device to operate upon the document whether it be a document marking device, a mechanism for sensing information from the document or means for moving the document. For example, in a record card verifier, each line or column of index positions are moved relative to a sensing mechanism. Adjacent to the sensing mechanism in a fixed relationship relative thereto is a punch for notching a column or line containing incorrect information. Punching or marking a column or line in error permits easy identification of the erroneous information to facilitate correction thereof subsequently.

In some instances for asynchronously operated document handling machines, both a document and a sensing device are moved simultaneously with respect to each other, however line identification to facilitate the marking of lines containing unreadable characters is not required because the line marking device is servoed wth the information senisng means.

While many character readers are capable of scanning information while the document is moving, it has been found to be desirable to read documents of high information content with the document stationary. The reason for desiring to read high information content documents in a stationary position is that the transport time for moving the document into and out of the read station is negligible with respect to the amount of time taken to read the information upon the document. Hence, the document through-put is not significantly affected. Further, there is much greater flexibility in reading the document when the same is stationary. Rescanning of information can take place as often as desired and the order in whch information is read can be selective. However, in order provide line marking and document indexing under this situation, it is highly desirable to accurately identify the line containing information which could not be read or the last line read prior to indexing. Line identification especially facilitates line marking outside of the reading station and permits indexing therewithin whereby the identified line is used as a reference for subsequent reading of information from the documents without skipping a line or reading a line twice.

The requirement for line marking emanates from the desirable of facilitating visual identification containing errors to permit an operator to manually correct the same without having to manually convert the entire document into data processing machine language. The need for document indexing within the read station centers mostly around the fact that with present technology the reading of characters can be accomplished with greater certainty when the scanning area is held to approximately 8½ by 5 inches. Hence, since many documents are 8½ by 11 inches, it becomes necessary to index the document two or three times within the document reading station.

In this invention, line positions on a document are identified either through the facility of a coded line identification track contained on the document or synchronized therewith. The coded line identification track divides the document into ap redetermined number of incremental areas. Each incremental area is identified by a different binary number. Two different ways are provided for coding the binary number identifying the incremental area within the line identification track. In one instance, information is coded in binary form according to different line widths, i.e., a line or mark of one width represents a binary zero bit and a line of another line width represents a binary one bit to constitute one method for coding the information. Lines of still another width bracket the binary coded lines for each incremental area. In the other method, the information is also coded according to a binary code; however, each incremental area on the document is identified by means of the presence of a line for a binary one bit and the absence of a line for a binary zero bit and a time basis is used for determining the significance of the binary one bits.

In each approach, additional identifying information is developed so as to further improve the accuracy of the identification and location of a line on the document. This latter identification is called a fine or vernier measurement whereas the previously described identification of an incremental area is called a coarse measurement.

Sensing of data represented by the line identification track within the reading station is accomplished by the same means used for scanning the document for information or character identification. A conventional cathode ray tube scanner is used for this purpose. The beam of the cathode ray tube is directed into the line identification track. It is then directed upward. The fine or vernier measurement is then made by measuring the distance from the point the beam enters the track to the first engaged bracket line. This measurement can be made digitally or analog. The fine or vernier measurement is then stored and the beam continues moving upwardly through the coded lines until it engages a second bracket line. The beam is then reversed and moved downwardly. As it moves downwardly it again crosses the code lines which are then decoded and the information in digital form is entered into storage. After having crossed all of the code lines, the beam again engages a bracket line. Thereafter, as the beam continues to move, the distance that it moves is continuously measured and the results of the continuous measurement are compared with the stored fine or vernier measurement. When the two measurements are equal, the beam is at the point where it had entered the line identification track. Whether or not the code bars are read while the beam is moving downwardly is not critical because they also can be read while the beam is moving upwardly from a first to a second bracket bar and then the beam is reversed to move downwardly in a manner described until it reaches the point of entry into the line identification track.

Since the line which had been read by the beam has now been identified, and if it is not the last line scannable, then upon the beam reaching the point of entry into line identification track, it can be directed downward and to the right to the next line of information to be read. If the line identified had been the last line scannable, then an indexing operation would take place and the identification data for the last line is used to relocate that line after indexing which is then used as a reference to facilitate continuous scanning without reading a line twice or skipping a line.

Therefore, this invention enables the selective identification of any line on a document while it is in the reading station. The line position information is stored in digital form. This information is then used for line marking and document indexing. Document indexing can take place in selective or fixed increments. To accomplish selective increment document indexing, the identification of the last line scanned within the reading station is ascertained and stored. The document transport then advances the document relative to the reading station and as this is done, a sensing device located external of the reading station, senses information from the line identification track. This information is compared with the stored information identifying the last line read and when there is comparison between the information sensed from the line identification track and the stored information, the document transport apparatus is stopped and thus a new area of the document is available for sensing within the reading station.

Indexing can also take place in fixed increments; however, the last line read must be available for reading after indexing. The last line position read or scanned, if line is blank, then serves as a reference for subsequent reading of lines. Hence, prior to indexing, the last line scanned is identified and its identity is stored. Then the document is indexed a fixed increment, however, with the last line read still within the scan area. Thereafter the beam of the cathode ray tube is directed to enter the line identification track and re-identify the last line read prior to indexing. After this has been done, the beam is directed from this identified line position to the next line to be read. Hence, for either mode of indexing, sensing of information on the document then continues with reference to the last line previously sensed. This precise reference provides continuity for sensing information on the document in a series of steps or indexes. It should be noted that the sensing device located externally of the reading station for sensing information from the line identification track could be one which senses the information optically or if the information within the line identification track were printed with magnetic ink, it could be a magnetic sensor. There is merit in each implementation; however, cost in some instances dictates the type of sensor used. When using an optical sensor, the bracket lines extend beyond the binary code lines to enable sensing thereof without sensing the binary code lines. As it will be explained shortly, for line marking purposes, line identification can be accomplished outside of the reading station by sensing only the bracket lines for the coarse measurement and then making a fine or vernier measurement. However, the edges of a document tend to become soiled, marked, stapled, etc., and this could interfere with line identification to a greater degree when sensing optically than when sensing magnetically. Of course, staples could be a problem for either method. But, magnetic sensing could provide another advantage because the bracket lines could be printed in magnetic ink and the binary code lines in nonmagnetic ink and thus the bracket lines could be sensed without interference from the code lines. This would permit the bracket lines to terminate further away from the edge of a document and thus be less susceptible of encountering conditions interfering with sensing the bracket lines. Obviously, if the line identification track is not contained on the document, then the edge condition of the document has no effect on the sensor. However, then the line identification track must be precisely synchronized with the document. It should also be noted that by placing an optical sensor external to the reading station, then when reading the line identification code with this sensor, the light therefrom cannot interfere with the light collection system for the cathode ray tube as it would if the sensor were located in the reading station.

Line marking is accomplished in a manner somewhat similar to indexing. After the document has been completely read, it is transported from the reading station toward a document stacking station. Intermediate of the document stacking station is a line marking device located with a fixed relationship relative to the external sensor for reading the line position identification track.

The identification of the first line to be marked is read out from storage so as to be available for comparison with line identification information developed by the external sensor as it reads the line identification track. The first line to be marked will be in direct alignment with the marking device when its line identification data read from storage compares with its line identification data read from the line identification track by the external sensor and through a fine or vernier measurement. The line marking device is operated in response to a signal generated from the comparison.

The line identification information for the second or next line to be marked is then read from storage to permit comparison thereof with line position information read from the line positon identification track by the external sensor as the document continues to move to enable marking the second line having an error. This action continues whereby all lines containing erroneous information are marked. It should be noted that blocks or boxes can be printed upon the document so as to be in alignment with the line marking column and at fixed distances away from the last line upon the document. Hence, by this arrangement, as the external sensor senses the last line on the document, the position of the boxes can be determined with reference to the last line and marks can be entered into the boxes as appropriate. For example, one box, if marked, can signify that an error occurred in reading a total or any other amount on the document. Another box can be used to indicate that there were no machine malfunctions. Still another box can be used to provide an indication that errors in reading occurred and those lines containing errors are identified by marks placed next to the beginning of the lines. In addition to line identification, the invention also provides for identifying different types of documents where each type of document is represented by a binary coded number. The binary document code number is represented in the same manner used to represent or identify an incremental area on the document. The code bars representing the document code number are read by the beam of the cathode ray tube. This is done prior to reading any characters on the document, because by knowing the document type, scanning of the characters can then take place according to the type of document. For example, it may be desirable to read only lines four and six of documents of a particular type. Further, document identification enables distinction between "header" and "continuation" sheets.

Accordingly, it is a principal object of the invention to provide improved apparatus for identifying line positions on a document.

Another very important object of the invention is to provide apparatus for identifying discrete line positions on a document in terms of coarse and fine positional information.

A more specific object of the invention is to provide improved apparatus for identifying discrete line positions on documents in terms of digital data.

Still another very important object of the invention is to provide apparatus for identifying lines on documents in terms of data which is used to control line marking and document indexing.

Another object of the invention is to provide apparatus for identifying lines on a document while the same is in a reading station and thereafter using this information together with newly developed line position information to reidentify the line as the document is advanced relative to the reading station to facilitate selective increment document indexing and selective line marking.

Still another object of the invention is to provide apparatus for identifying lines on documents through the facility of a line identification track which is precisely related to the document.

Yet another object of the invention is to provide apparatus for line identification where the line positions on the document are not preestablished.

Still a further object of the invention is to provide apparatus for identifying lines on documents by using a line identification track containing information in binary coded form.

A further more specific object of the invention is to provide improved document line identification by using a line identification track containing data in binary coded form where the binary bits are represented by lines of different thicknesses.

Another further specific object of the invention is to provide improved document line identification apparatus which utilizes a line identification track containing line indentification information in binary coded form where the binary bits are represented by the presence and absence of lines and significance or weight of the binary bits is defined on a time basis.

Still another object of the invention is to provide apparatus for identifying types of documents which contain identification codes represented by binary coded lines.

The foregoing and other objects, features and advantages of the invention will be apparent from the following more particular description of preferred embodiments of the invention, as illustrated in the accompanying drawings.

In the drawings:

FIG. 1 is a schematic block diagram illustrating a first embodiment of the invention;

FIG. 2 consisting of FIGS. 2*a*, 2*b*, 2*c*, etc., taken together as shown in FIG. 3 is a schematic logic diagram of the first embodiment of the invention illustrated in block form in FIG. 1;

Figures 3, 4, 4A:
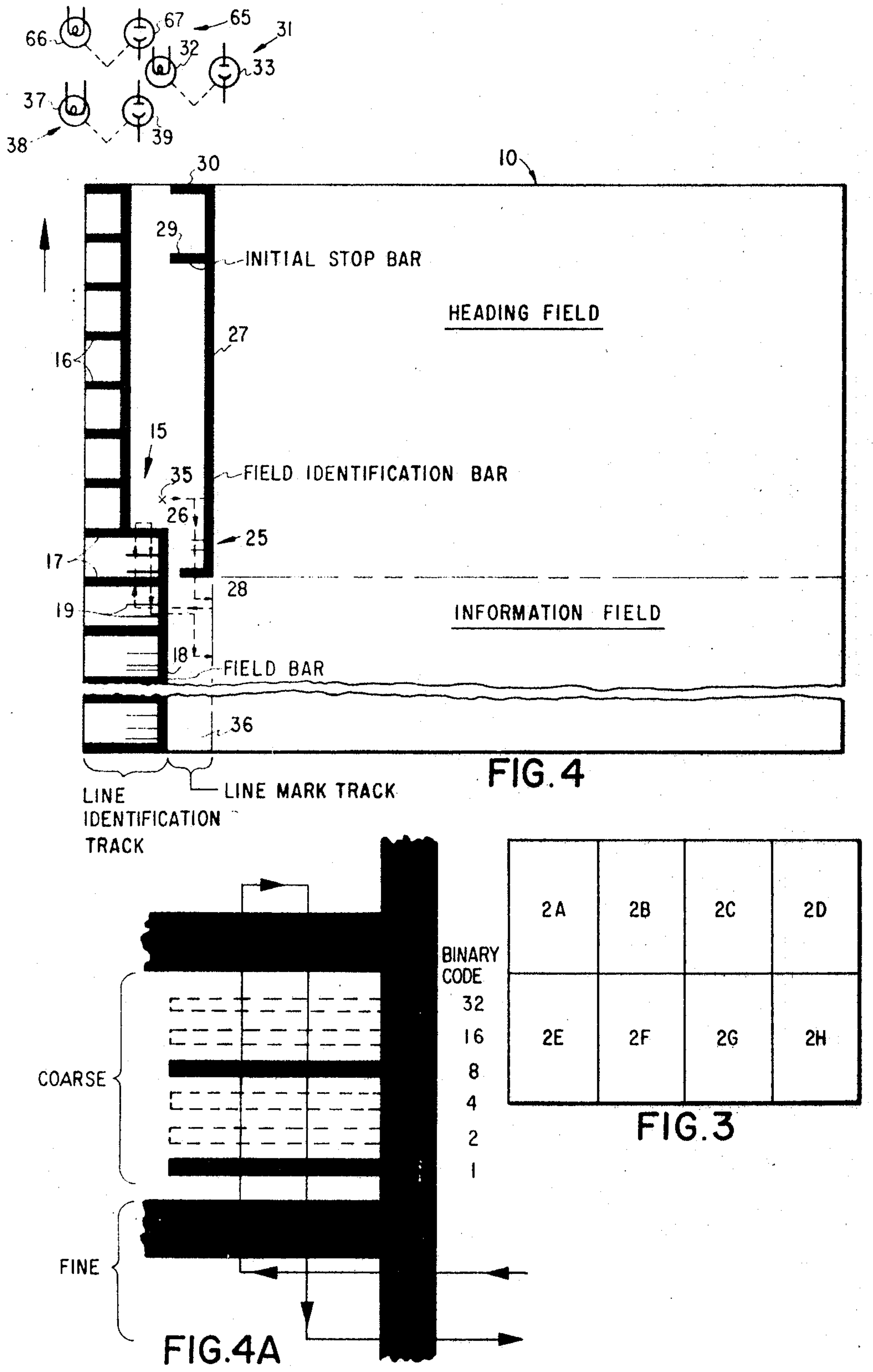
FIG. 3 is a diagram illustrating the arrangement of FIGS. 2*a*, 2*b*, 2*c*, etc., for constituting FIG. 2.
FIG. 4 illustrates a typical document having a line identification track, a stop bar and a document identification code contained thereon, all being adapted for the first embodiment of the invention.
Figure 5A:
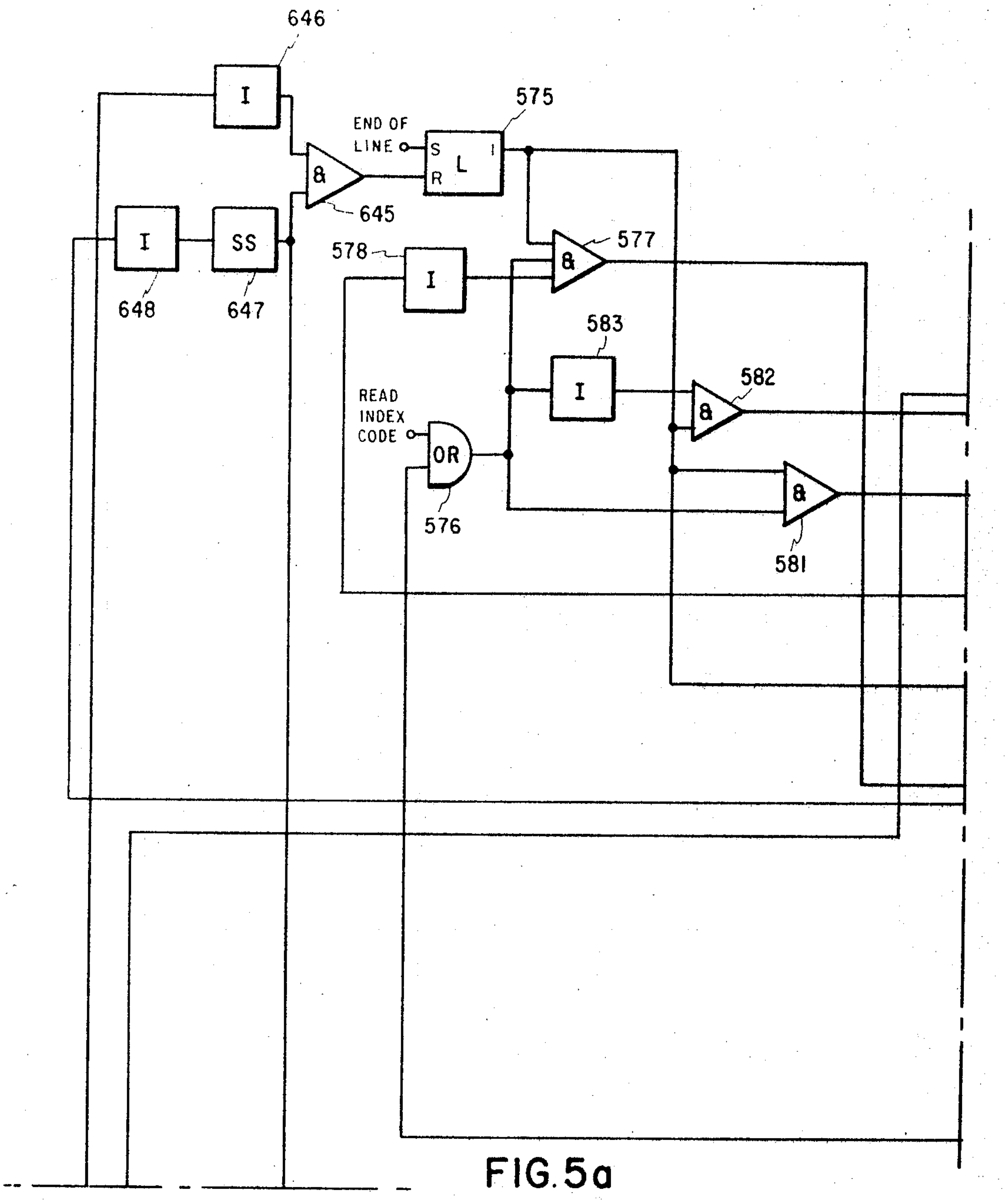
Figure 5B:
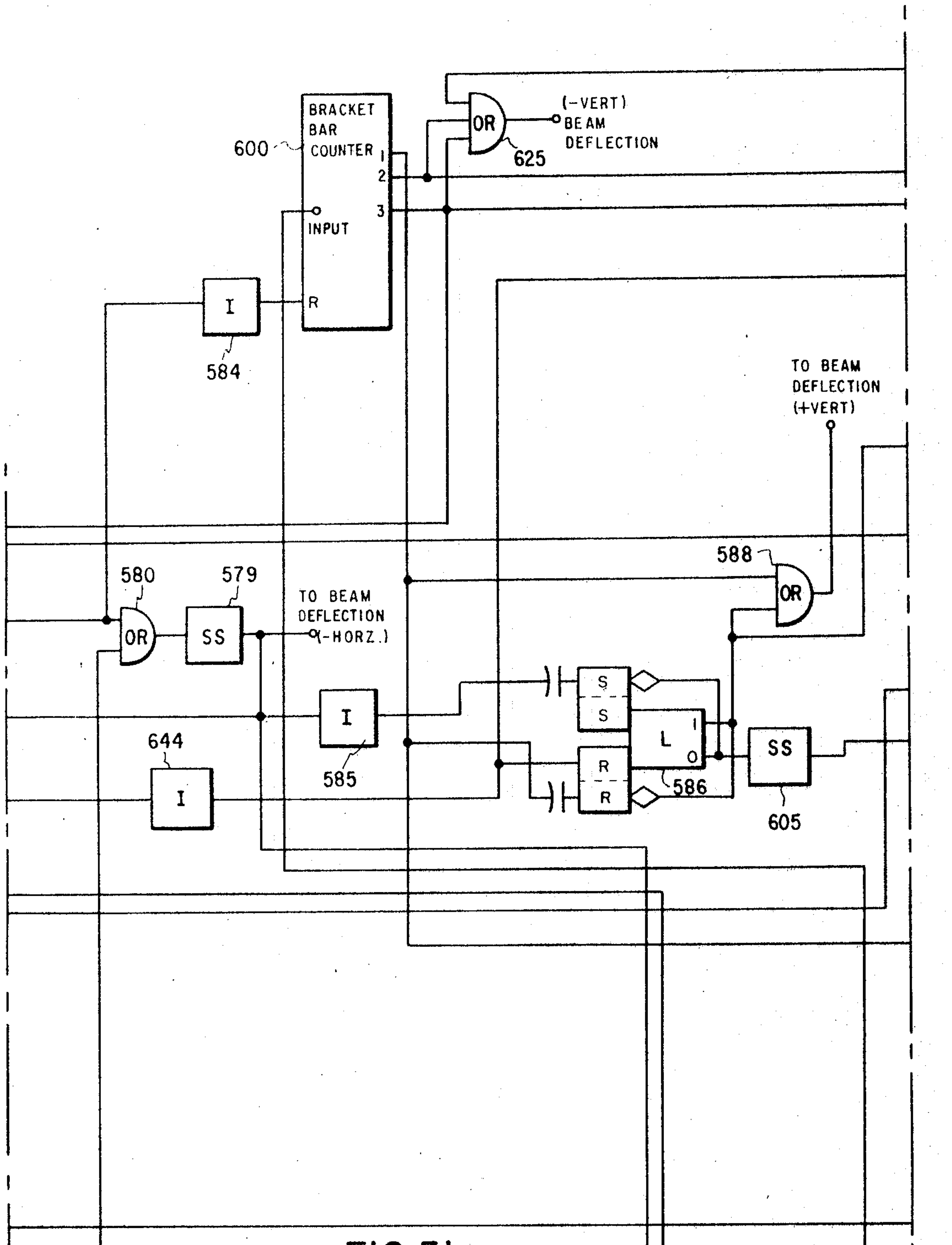
Figure 5C:
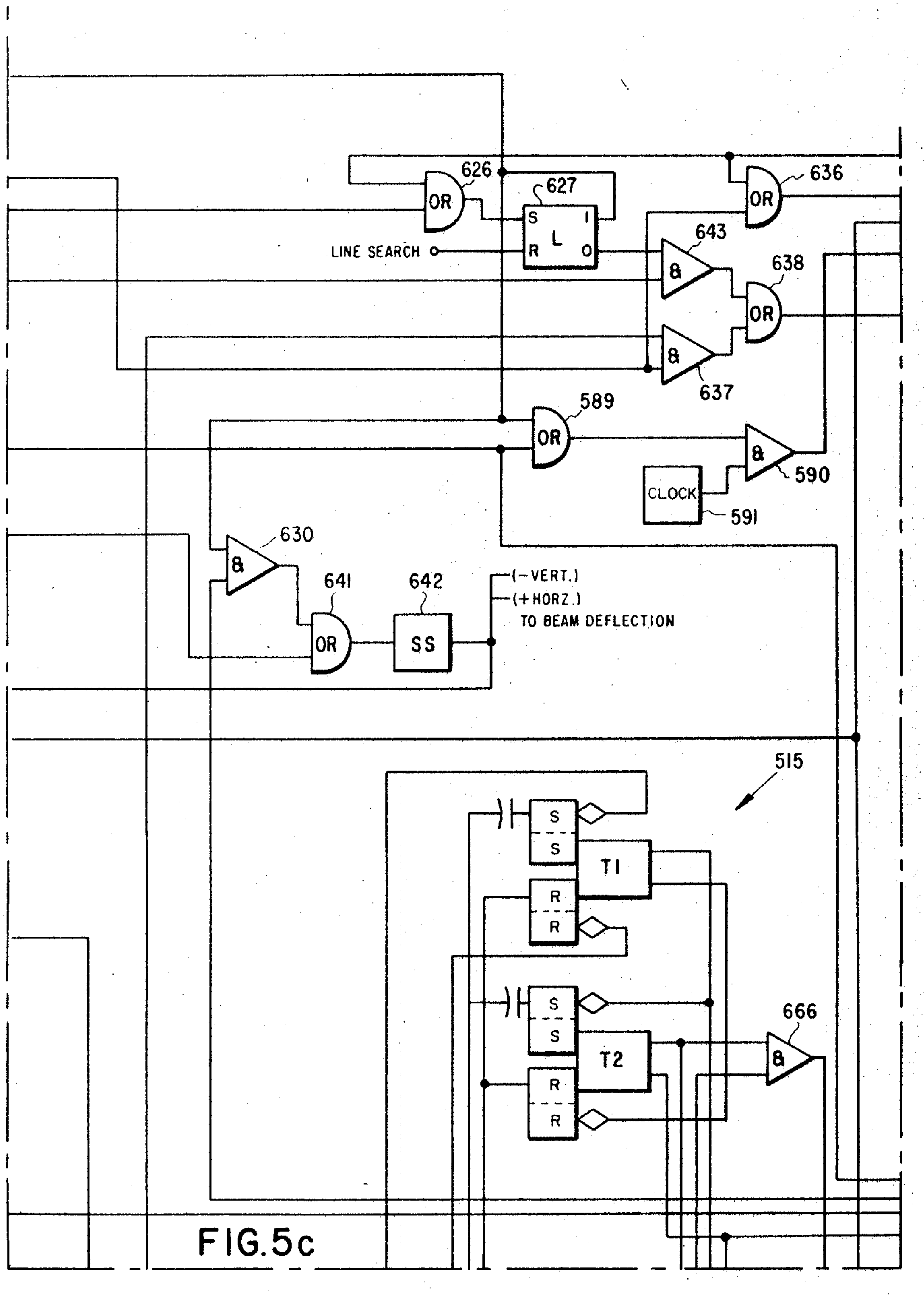
Figure 5D:
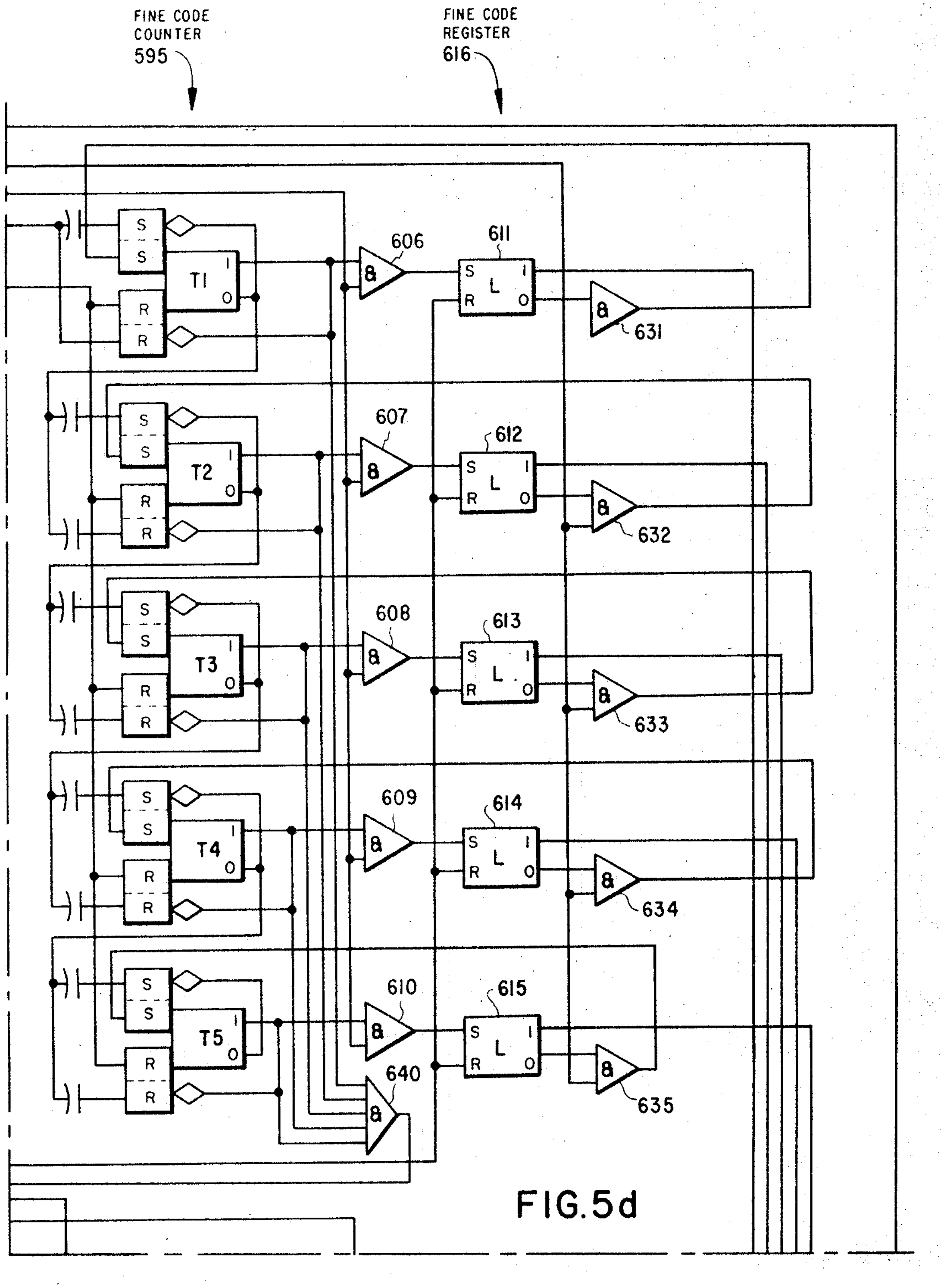
Figure 5E:
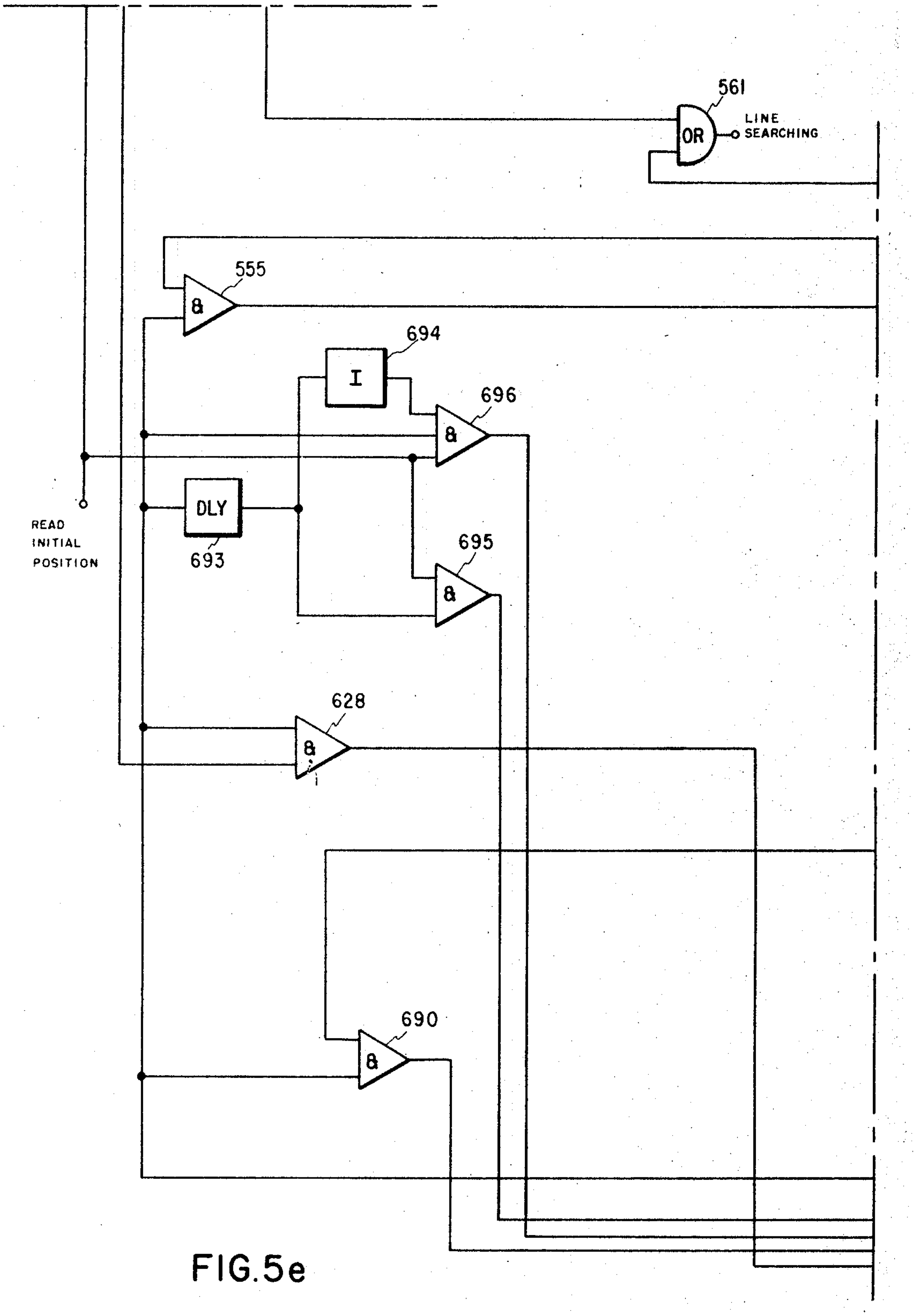
Figure 5F:
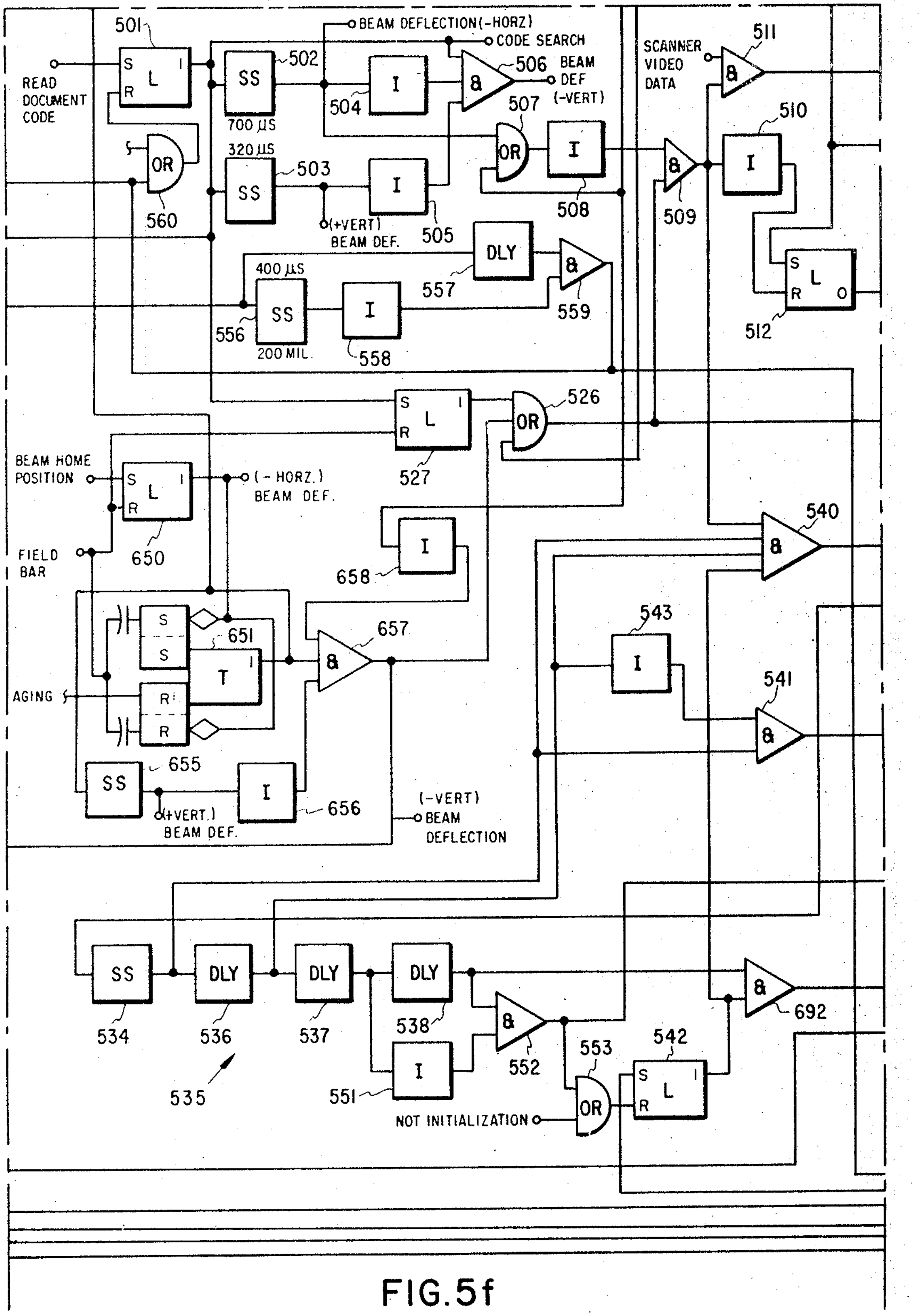
Figure 5G:
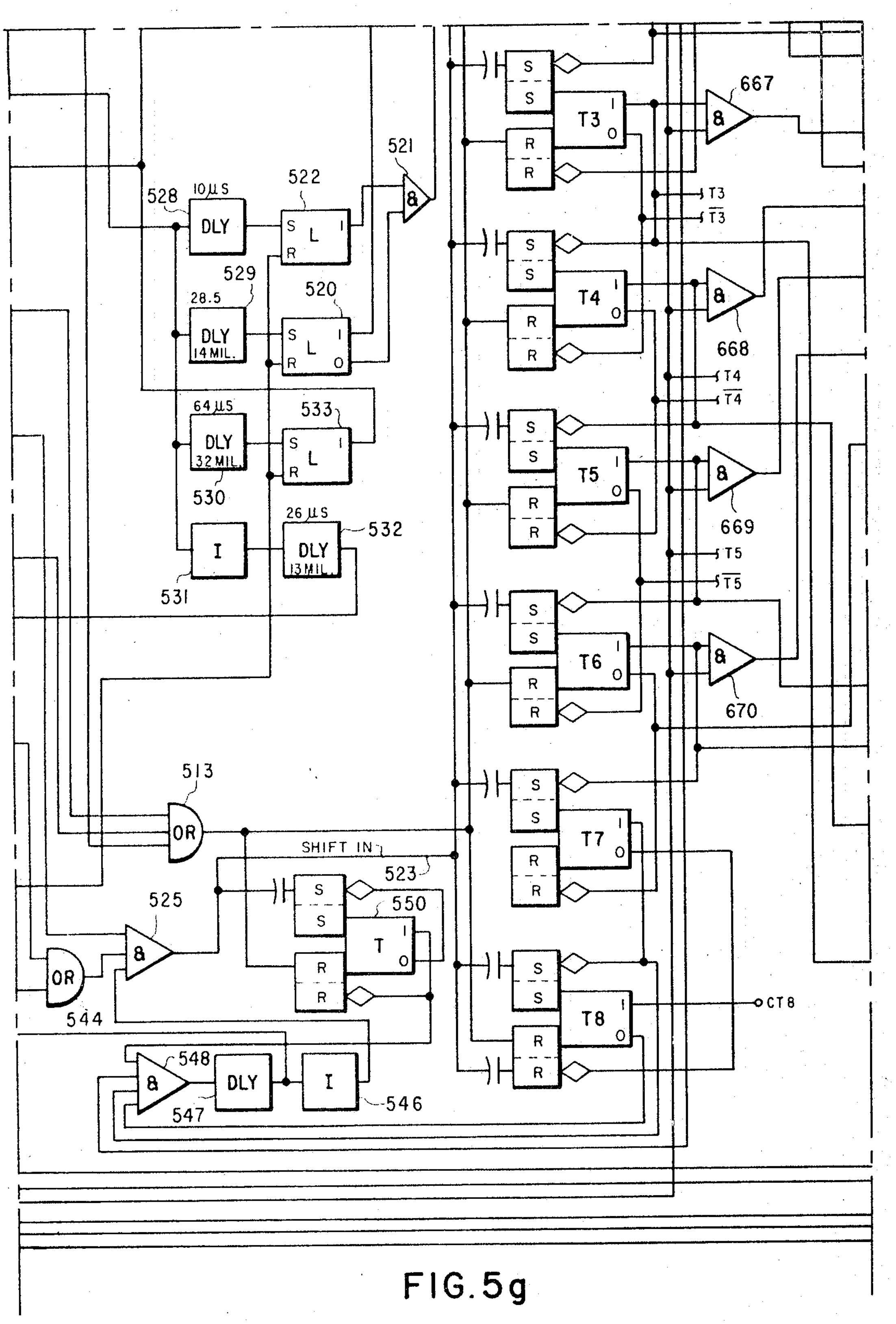
Figure 5H:
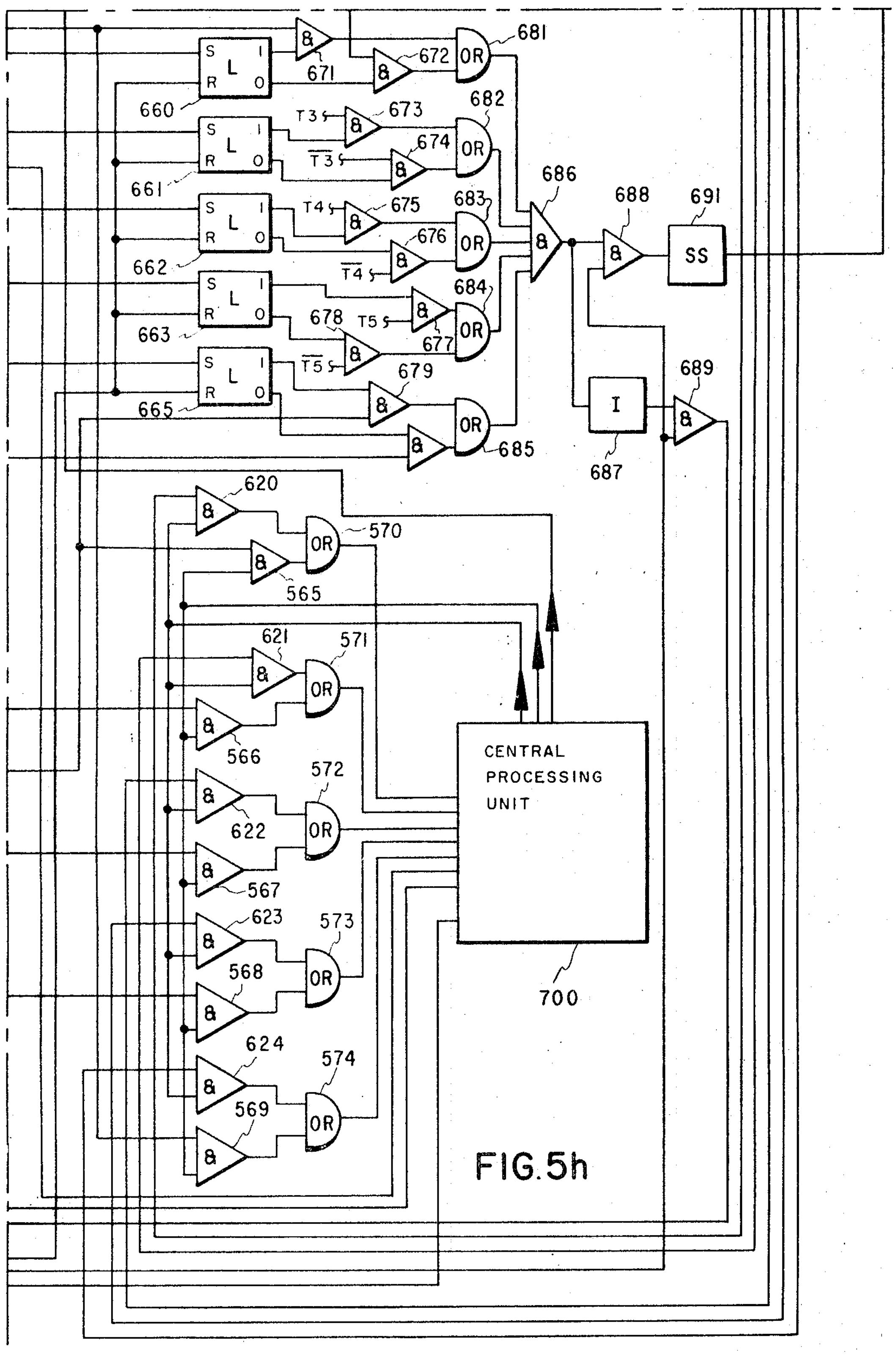
Figure 8:
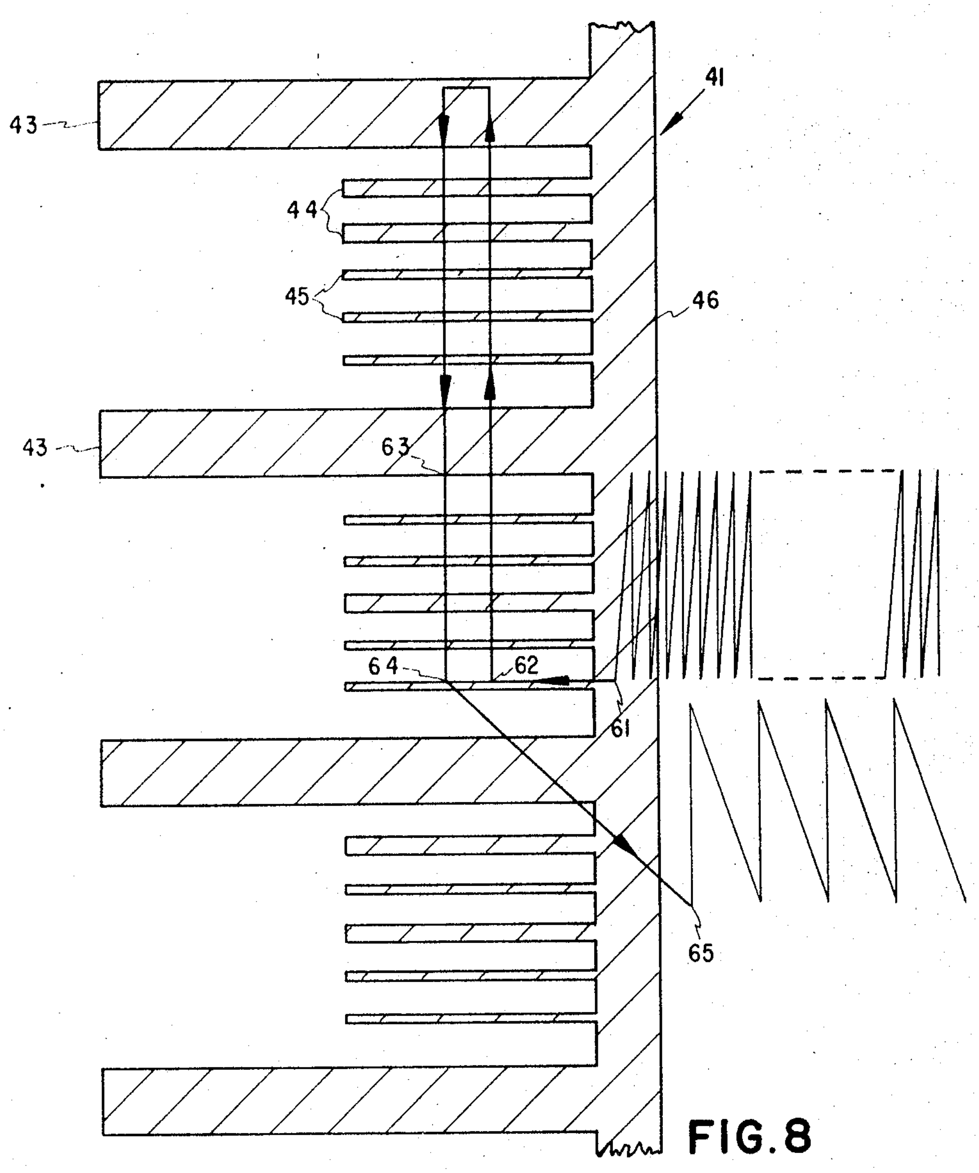
Figure 6:
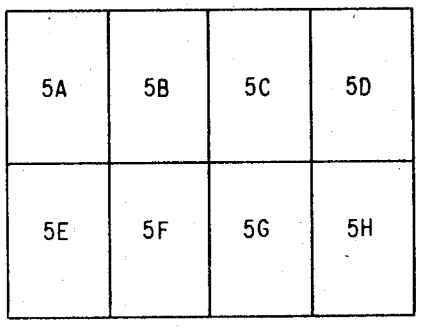
Figure 7:
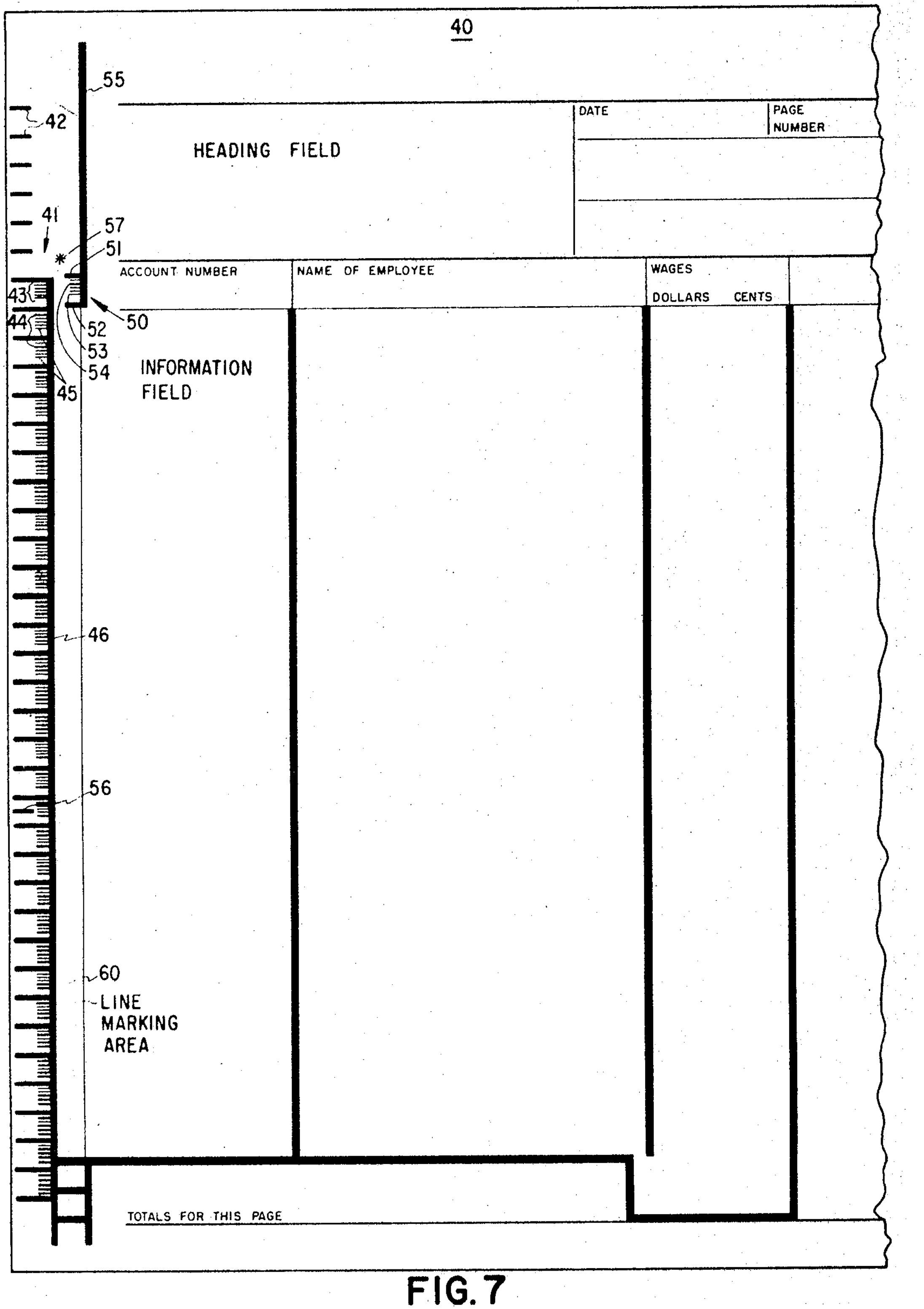

FIG. 4*a* is an exploded fragmentary view of the line identification track of FIG. 4;

FIG. 5 consisting of FIGS. 5*a*, 5*b*, 5*c*, etc., taken together as shown in FIG. 6 is a schematic logic diagram of the second embodiment of the invention; however, with the logic for beam initialization and line marking omitted;

FIG. 6 is a diagram illustrating the arrangement of FIGS. 5*a*, 5*b*, 5*c*, etc.;

FIG. 7 illustrates a typical document having a line identification track, a stop bar and a document type code contained thereon and adapted for the second embodiment of the invention; and FIG. 8 is an exploded fragmentary view of the line identification track of FIG. 7.

GENERAL

The broad concepts of the invention will be best understood by referring to FIGS. 4 and 7 which illustrate by way of example two line identification tracks for two embodiments of the invention. In this particular instance, the line identification tracks are contained upon documents. However, the line identification tracks can also be separate from the documents and the documents must then be referenced to or synchronized therewith.

FIG. 4 shows a document 10 having a line identification track 15 and a document identification code track 25. The line identification track 15 has a series of horizontal bars or lines 16 longitudinally spaced a predetermined distance from each other. The bars 16 facilitate line identification for both document indexing and line marking. The bars 16 function to divide the document into incremental units or areas. For purposes of clarity, the designation of bar 16 will be limited to those bars associated with the heading field on the document, while horizontal bars 17 which have the same spacing as bars 16 are the ones along the side of the information field on the document. Obviously, some documents might not have a heading field and the distinction would not be of much significance.

The bars 17 extend further to the right than the bars 16 and terminate in a vertically extending field bar 18. The bars 17 bracket the incremental unit areas which are each uniquely identified by a binary number. The binary number for each incremental unit area is represented by means of code bars or lines 19. For this particular embodiment, within each incremental area there is provision for six binary code lines to represent the binary digits 1, 2, 4, 8, 16 and 32, respectively. Hence, each incremental area can be identified by a discrete binary number.

The document identification code track 25 permits documents to be identified according to a binary number. By being able to identify a particular type of document to be read, it is possible to effect various controls with respect thereto. For example, in many instances, it is not possible to get all of the information onto a single document. This leads to the general practice of using continuation sheets. The format of the continuation sheet differs from the format of the so-called header sheet. Hence, each document type is given a different number as represented by the binary code and this number, upon being decoded, is used to effect certain beam control functions. The document type number can also be used to control the apparatus for transporting the documents into and out of the reading station. For example, if a document were identified by a particular number, this could be used to signify that only three lines of inforamtion are to be read from the particular document. Thereafter, upon reading the three particular lines, the document is to be ejected from the reading station. Consequently, the identification of the particular document plus reading three lines of information therefrom, can develop a signal for starting the document transport to eject the document from the reading station. Further, and if nothing else, the document code can be used for determining whether the beam deflection circuits and the line identification circuits are operating properly because substantially the same circuits are used for line identification as for document type identification.

The document identification code track 25 is pre-printed upon the document just above the information field and the document type number is represented by the binary code bars 26. The document identification code number is represented by any combination of six binary code bars 26 for the binary digits 1, 2, 4, 8, 16 and 32. The binary code bars 26 terminate at their righthand edge in a field identification bar 27. A heavy or thick horizontal bar 28 extends from the field identification bar 27 in the same direction as the code bars 26 in a position to indicate the end of the document identification code area.

In order to precisely stop the document within the reading station, a preprinted horizontal bar 29 is located a fixed distance from the start of the information field. While bar 29 functions as a reference for stopping the document within the reading station, horizontal bar 30 extending from field identification bar 27 along the upper edge of the document permits positive detection thereof and thus facilitates the elimination of mistaking the leading edge of the document for the initial stop bar 29. In other words, a stop signal is passed to the controls for the document transporting apparatus only if detector 31 detects bars 30 and 29 in that order. Detector 31 consists of a light source 32 and a light sensitive element 33.

With the document 10 initially stopped within the reading station, a beam of the cathode ray tube for scanning the document is initialized to a home position which corresponds to position 35 on the document. The beam starts from the home position and moves to the right until it engages the field identification bar 27. The beam then is directed downwardly at an angle to the left to make sure that it is out of the field identification bar and in a position to be directed vertically downwardly to read the document identification code. As the beam moves through the document code, information is generated in binary coded form. This binary coded information provides an indication of the document type. Detection of bar 28 indicates the start of the information field. The beam is permitted to continue downward for a fixed distance from bar 28 and then is directed to the right and the operation is switched into a line search mode.

Line searching does not form a part of this invention but briefly described, the beam is caused to raster across the document in search of a line of information. Upon finding a line of information, the raster is centered with respect thereto and normalized according to the height of the characters. The line centering and normalizing operation continues until the beam approaches the end of the line or the righthand edge of the document. The beam is then caused to raster to the left and scan the characters for information content. If, after reading a line of information, no error occurred with respect to identifying any character, then the beam is moved downwardly and rastered to the right in search of the next line to be read. However, if a character could not be identified while reading the line of information, then, after that line has been completely read, the beam is caused to move into the line identification track.

The beam first engages field bar 18 and then moves horizontally to the left a predetermined distance from the field bar 18. Thereafter, the beam is directed upwardly in search of a first bracket bar 17. The distance that the beam moves from the point of entry into the line position code track through the first bracket bar 17 is measured and stored. This measurement is arbitrarily designated the fine or vernier measurement. The beam continues to move upwardly until it detects the end of a second bracket bar 17. The beam is then reversed and moved downwardly. As the beam moves upwardly from the first bracket bar 17, binary coded information is generated upon sensing code bars 19 and this binary information indicates the identity of the incremental area and this information together with the fine position information identifies the line position. The coarse and fine line position information is stored. As the beam moves downwardly it passes through a bracket bar 17 and then through the code bars 19 to the next bracket bar 17. Upon reaching this bracket bar 17, the fine position information is retrieved and the beam continues to move until it reaches the level at which it entered the line position track. The retrieved fine or vernier information is used for determining this level.

The binary coded information developed in response to reading code bars 19 is arbitrarily designated the coarse measurement while the information developed as the beam moves upwardly from the level of entry to the first bar 17 is termed the fine or vernier measurement. Thus the exact location of the line read has been ascertained and stored. This stored information can be used for finding this line position at another time such as for line marking or document indexing. It should be noted with respect to FIG. 4 that the beam, when moving into, within and out of the line position identification track, follows along the same path. However, in order to depict movement of the beam more clearly, the beam path for moving into and upwardly within the line position identification track is shown displaced from the path that the beam takes as it moves downwardly and out of the line position identification track. FIG. 4*a* more clearly shows the movement of the beam into, within and out of the line position track.

It should be noted that the coarse binary coded information serves to identify an incremental area of the document. There is no attempt to have the lines of information aligned with the incremental areas or to have a one for one correspondence. There can be more than one line of information within an incremental area. Consequently, there is a need for the fine or vernier measurement. By this arrangement, there are less restrictions on document origination and still each line position on the document can be accurately described as to location in terms of data. This data is then stored and selectively recalled for purposes of reidentifying particular line positions.

The details for line marking and document indexing will be described later herein. Also, the details for ascertaining the significance or weight of the code bars 19 and 26 will be presented in the detailed description of the invention. The foregoing provides a general understanding of the first embodiment of the invention. A similar general understanding of the second embodiment of the invention can be had with reference to FIG. 7. In FIG. 7 a document 40 having a line identification code track 41 and a document identification code track 50 is shown. The document code track 41 includes a first series of horizontal vertically spaced code bars 42 alongside the heading field of the document. The bars 42 in this particular embodiment permit the line marking device to be separated a fixed distance from the sensor for reading the marks 42. This is a matter of physical requirements and in some instances it could be possible and desirable to have the line marking device and sensor aligned laterally adjacent to each other. Marks are made alongside lines containing the characters which could not be identified in the line marking area 60. Hence, the bars 42 are somewhat similar to bars 16; however, they are not used for document indexing because, in this particular example, indexing takes place in fixed increments and the last line read prior to indexing always remains within the scanning area to serve as a reference for continued scanning of the document after indexing.

The information field of the document is divided into incremental areas by means of bracket bars 43. Each incremental area is identified by a binary coded number by means of code bars 44 and 45 which represent binary 1 and zero bits respectively. The bracket bars 43 and the code bars 44 and 45 extend horizontally to the left from a vertically extending field bar 46. In this particular example, for the second embodiment, the bracket bars approximately forty mils thick while the code bars 44 and 45 are twenty and ten mils thick respectively. Hence, the type of bar is determined by sensing its thickness. This can be done quite accurately through the facility of the beam of the cathode ray tube.

The document code is contained between bracket bars 51 and 52. Ten mil code bars 53 are used to represent binary zero bits and twenty mil code bars 54 represent binary one bits. The bars 51 and 52, 53 and 54 horizontally extend to the left from vertically extending field bar 55.

A forty mil preprinted horizontal bar 56 is contained within the line identification track as the sensible mark for facilitating the generation of a signal to effect the stopping of the document initially within the reading station. With the document initially stopped in the reading station, the beam of the cathode ray tube is positioned to an initialization point which corresponds to position 57 on the document. The beam is directed horizontally to the right from its initialization point until it engages field bar 55. The beam is then moved out of the field bar upwardly to the left so as to become positioned for a vertical downward movement through the document identification track 50. Thus the beam is then directed vertically downwardly to pass through the document identification track. As the beam passes through the document identification track, signals are developed in binary coded form. These signals are examined or decoded to provide a binary number indicative of the document type.

After passing through the document code, the beam continues downwardly for a predetermined distance and is then directed to the right. The beam then rasters across the document to the right in search of a line of information. Upon finding a line of information, the raster is centered thereon and the raster height is normalized with respect to the character height. Line centering and normalization take place as the raster moves from left to right. A line of information is read while the beam is rastering from right to left. Thus, after reading a line of information, the beam ends adjacent to a field bar 46. If an error did not occur while reading the line of information, then the beam is down spaced in search of the next line of information to be read. The beam raster is again centered with respect to the new line of information and normalized according to the character height as the raster moves from left to right.

If a character could not be identified while reading a line of information, then after that line has been read, as determined by the beam reaching point 61 within field bar 46 as shown in FIG. 8 the beam is directed horizontally to the left a predetermined distance to point 62 so as to be within the line identification track 41. The beam is then directed upwardly. The fine or vernier measurement is made by measuring the distance that the beam travels upwardly from the level at which it entered the line identification track to the first encountered bracket bar 43. This measurement is then stored. However, the beam continues moving upwardly until the second bracket bar 43 is detected. The beam is then reversed and moved downwardly along the same path of its upward movement. FIG. 7 shows the two paths displaced for clarity purposes only.

While moving downwardly, as the beam engages the first code bar, either a code bar 44 or 45, the thickness thereof is measured and either a binary zero or one bit is developed. After the beam passes through the particular code bar it enters into the white area between the code bars. During this time the decoded binary bit, i.e., a binary zero or one, is entered into a shift register. This operation continues until the bracket bar 43 is detected such as at point 63. It should be noted that there are five code bars between the bracket bars 43 to represent the binary digits 1, 2, 4, 8 and 16. The bracket bars 43 are decoded as binary one bits and thus upon the beam reaching point 63, there should be seven bits in the shift register. The shift register in this example, is an eight position shift register. After the line position code has been entered into the shift register, there should be a zero bit or nothing in position 8. Further, positions 1 and 7 will always contain a binary one bit as a result of detecting the bracket bars 43. Hence, if 7 bits, either binary zeros or ones for positions 2 through 6 and binary one bits for positions 1 and 7 have been entered into the shift register with nothing entered into position 8, then a valid code has been read.

After reading the coarse code the beam continues moving downwardly from position 63 a distance equal to the fine or vernier measurement to a position 64 which is at the same level as position 62. Actually, the two positions 62 and 64 coincide but are shown horizontally displaced for purposes of clarity. Hence, the beam is returned to its original level of entry into the line identification track. Thereafter the beam is directed downwardly to the right a fixed distance, slightly greater than one raster height, to position 65. The beam is then rastered to the right in search of a new line of information.

From the immediate foregoing it is seen that the position of a line is expressed in terms of a fine or vernier measurement and a coarse measurement. The fine or vernier measurement is made by determining the distance that the beam travels from its point of entry into the line position track to a first bracket bar 43. In this particular example, as it will be seen later herein, this measurement is expressed in terms of a digital number. The coarse measurement is made by reading the coded information between the first and second bracket bars 43 engaged after the beam has entered into the line identification track. Actually, the coded information between the bracket bars is read after the beam has detected the second bracket bar 43 and is reversed to move toward the first bracket bar previously engaged. The coded information is a digital number identifying the incremental area between the two bracket bars. With the identity of the line having been made and the information stored, the information then can subsequently be recalled from storage to facilitate either line marking or document indexing. The line marking and document indexing operations to be described in detail later herein will now be briefly described.

The lines containing characters which cannot be identified are marked after the document has been transported from the reading station. These lines are marked with the document moving at a constant velocity. Both the fine and coarse measurements have been stored for each line position to be marked. As the document moves from the reading station, a detector detects the bars 16 and 17 for the first embodiment and bars 42 and 43 for the second embodiment. As each bar is detected, an entry is made into a counter. The contents of the counter are compared with the coarse measurement which had been stored for the first line to be marked. When the count in the counter compares equal to the coarse measurement retrieved from storage, clock pulses of the same frequency as used for making the fine measurement are gated into a counter. When the count in this counter compares equal to the fine or vernier measurement for the first line to be marked, a signal is generated for operating the line marking device. The first line to be marked will be directly under the marking device at the time it is signaled to operate.

As the document continues to move, the counting of the bracket bars continues and the stored coarse and fine measurement for the second line to be marked is retrieved and made available for comparison with the information entered into the two counters as a result of sensing the bracket bars and entering clock pulses. When there is comparison between the two sets of information, the line marking device is again operated. This operation continues until all lines containing unidentifiable characters have been marked.

Document indexing takes place in a slightly different manner for the first embodiment than for the second embodiment. In connection with the first embodiment, prior to document indexing, the identification of the last line read is stored in terms of the coarse and fine position measurements. Thereafter the document transport is started and as the document advances an indexing stop line detector 38 senses the horizontal bars 16 to develop a coarse count. It can be noted that the counter for developing this coarse count is preset with a number corresponding to the number of coarse position marks between the position of the sensor 38 and the required stop position within the scan window. When the coarse count developed by reading the horizontal bars 16 equals the stored coarse count for the last line identified, clock pulses are permitted to enter a binary counter to develop a fine count. When the developed fine count equals the stored fine count, a stop signal is generated and this signal is used to stop the operation of the document transport.

After indexing takes place, then in order to find the next line to be read without skipping a line or reading a line twice, the beam of the cathode ray tube is moved to its home position and from there to the left a short distance and then moved down to search for the last line read prior to indexing. On locating this last line by means of identifying its coarse and fine position, the beam is directed downward and to the right a predetermined distance and then the operation switches into a line search mode.

In connection with the second embodiment, document indexing is done in fixed increments. Each index increment is of such a distance that the last line read prior to indexing always remains within the scan window. Thus the last line read is identified prior to indexing and this identity in terms of the coarse and vernier measurements is stored. Thereafter, indexing takes place in a fixed increment. After indexing, the beam is directed to enter the line identification track to determine the identity of the last line read prior to indexing. After identifying the last line read, which is still within the scan window, the beam is then caused to search for the next line to be read.

The foregoing generally describes the manner in which line positions on a document are identified in terms of digital data representing both coarse and fine or vernier measurements for the particular line positions. Further, the above generally describes how this line position information is used for line marking and document indexing purposes. A detailed description will now be given. The first embodiment will be described in detail and this will be followed by a detailed description of the second embodiment.

DETAILED DESCRIPTION

Figure 1:
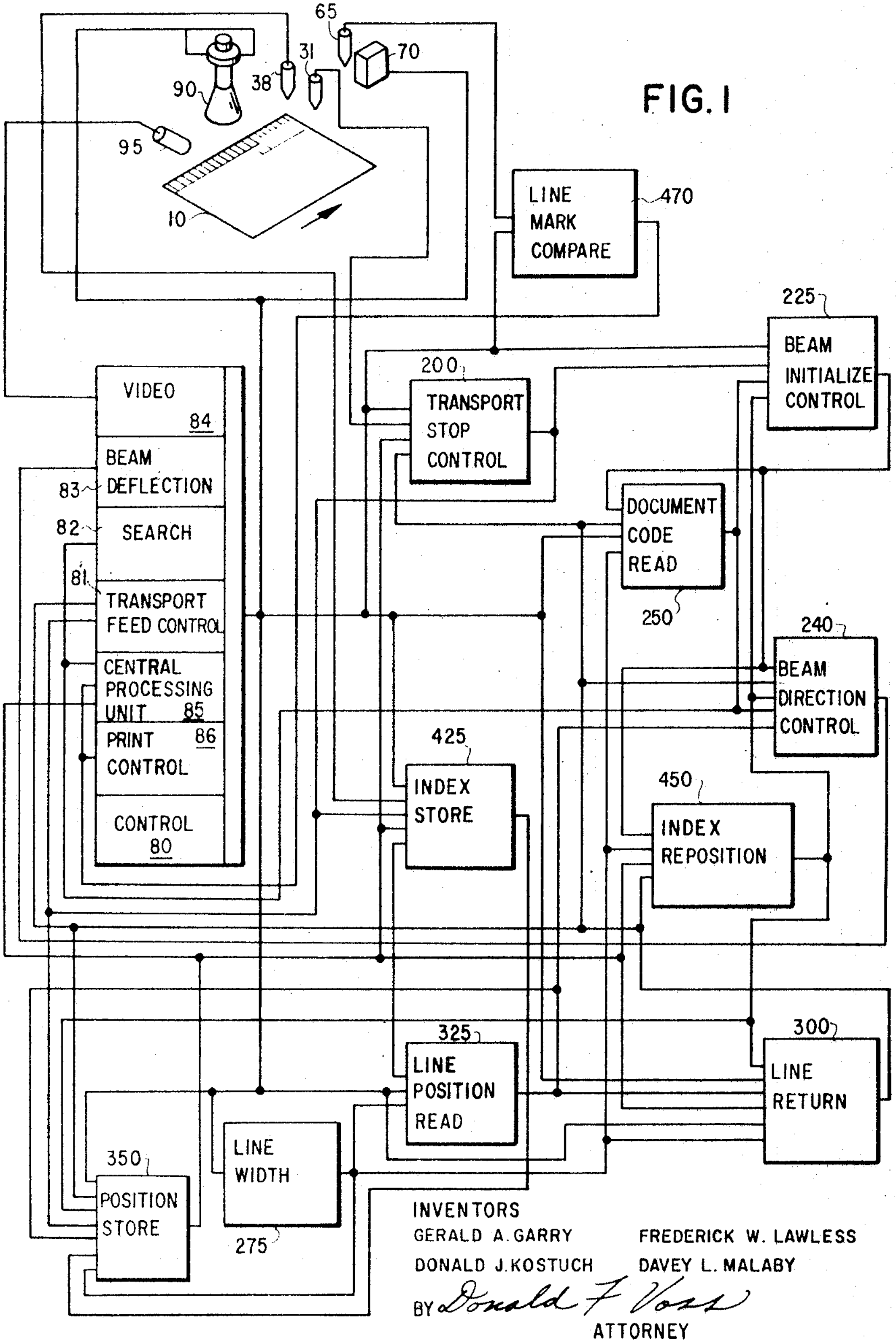
Figure 2A:
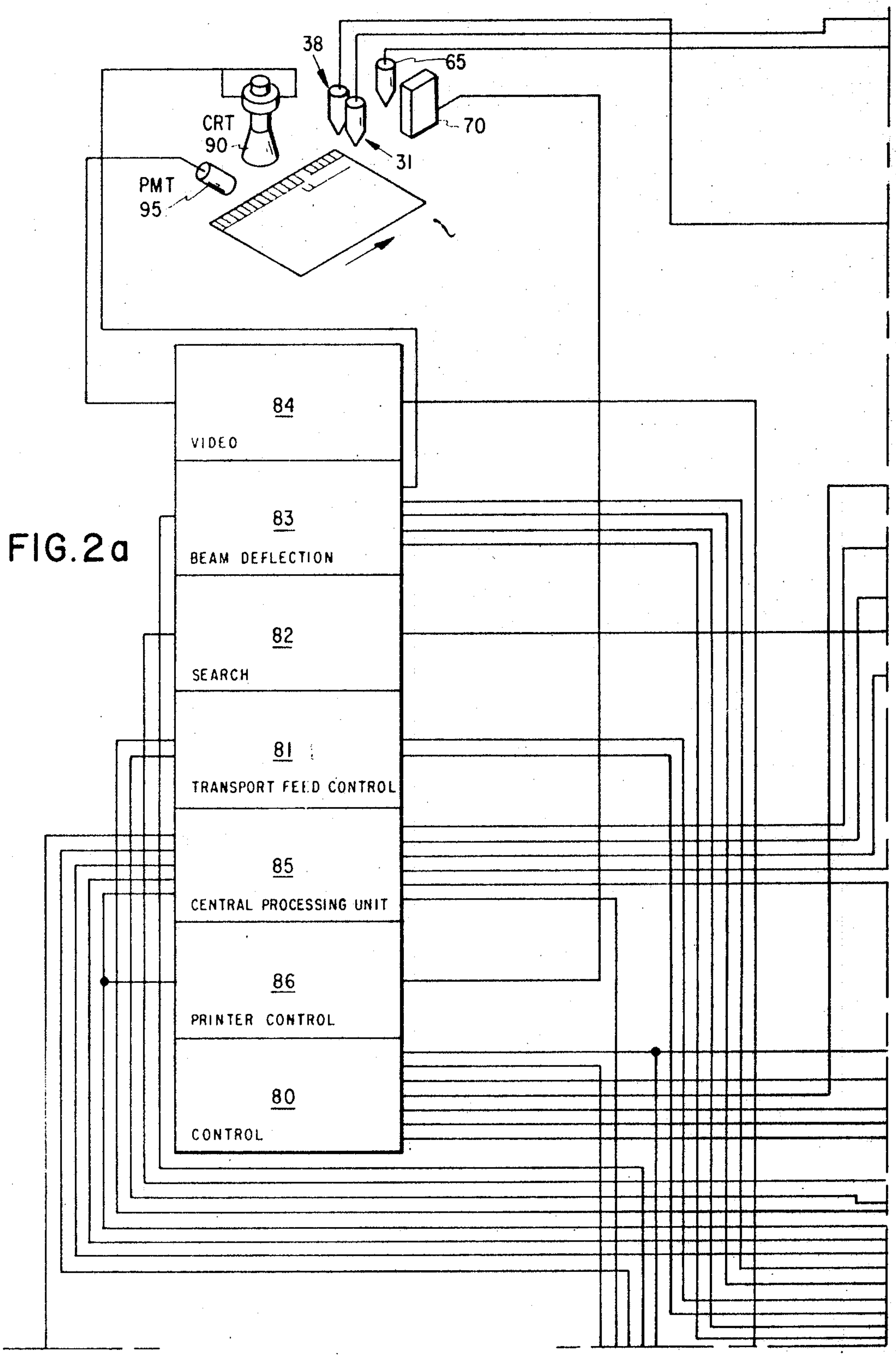
Figure 2B:
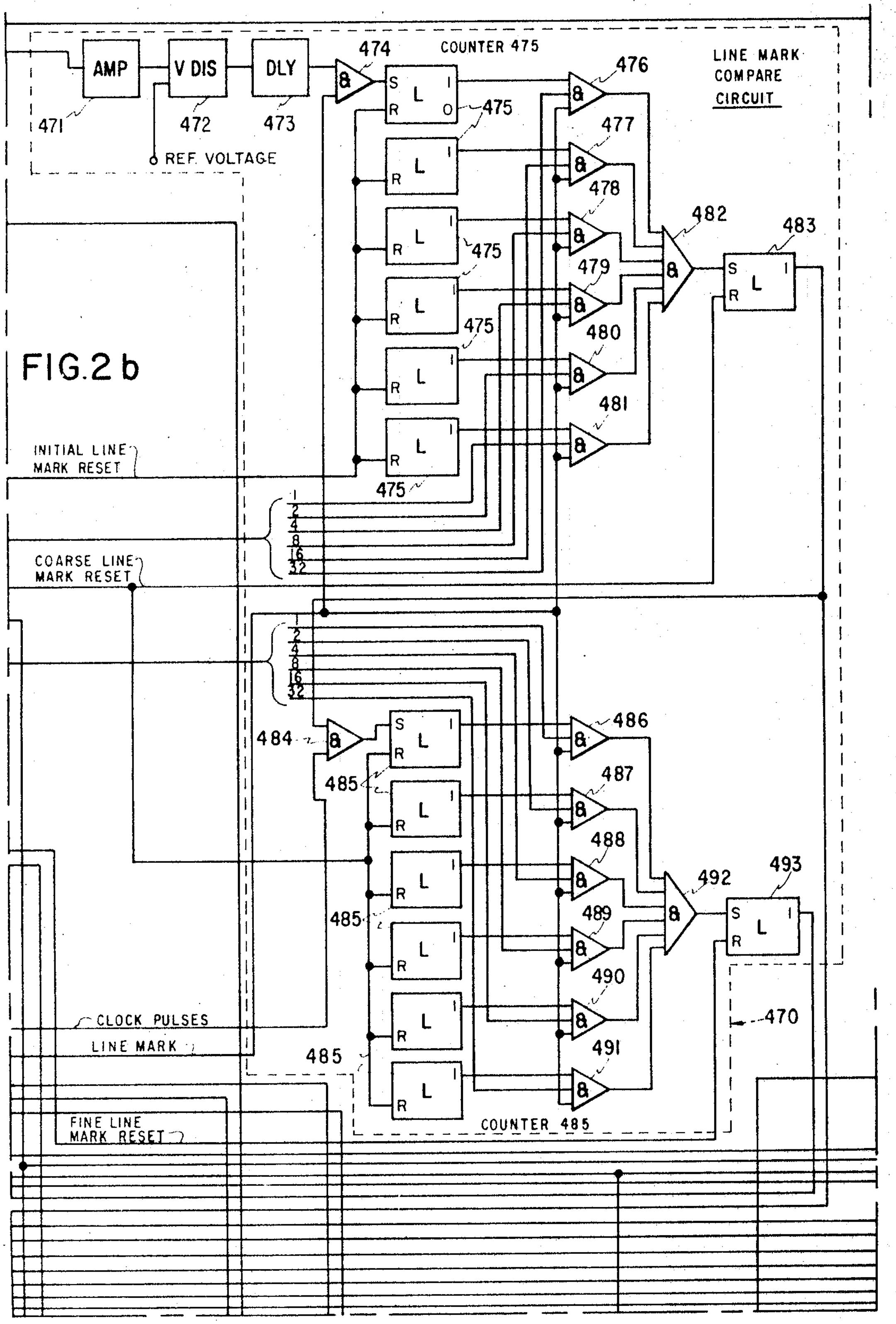
Figure 2C:
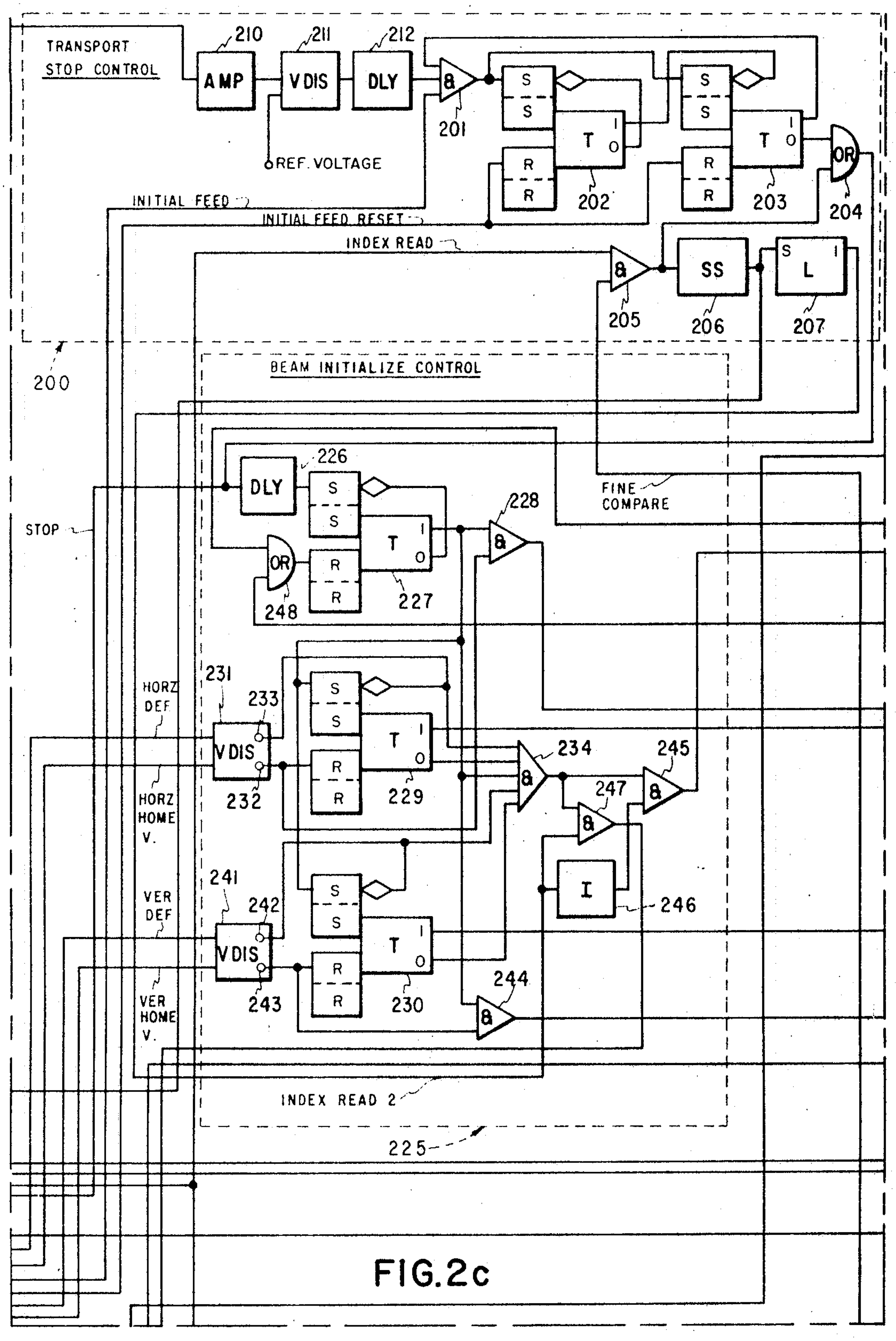
Figure 2D:
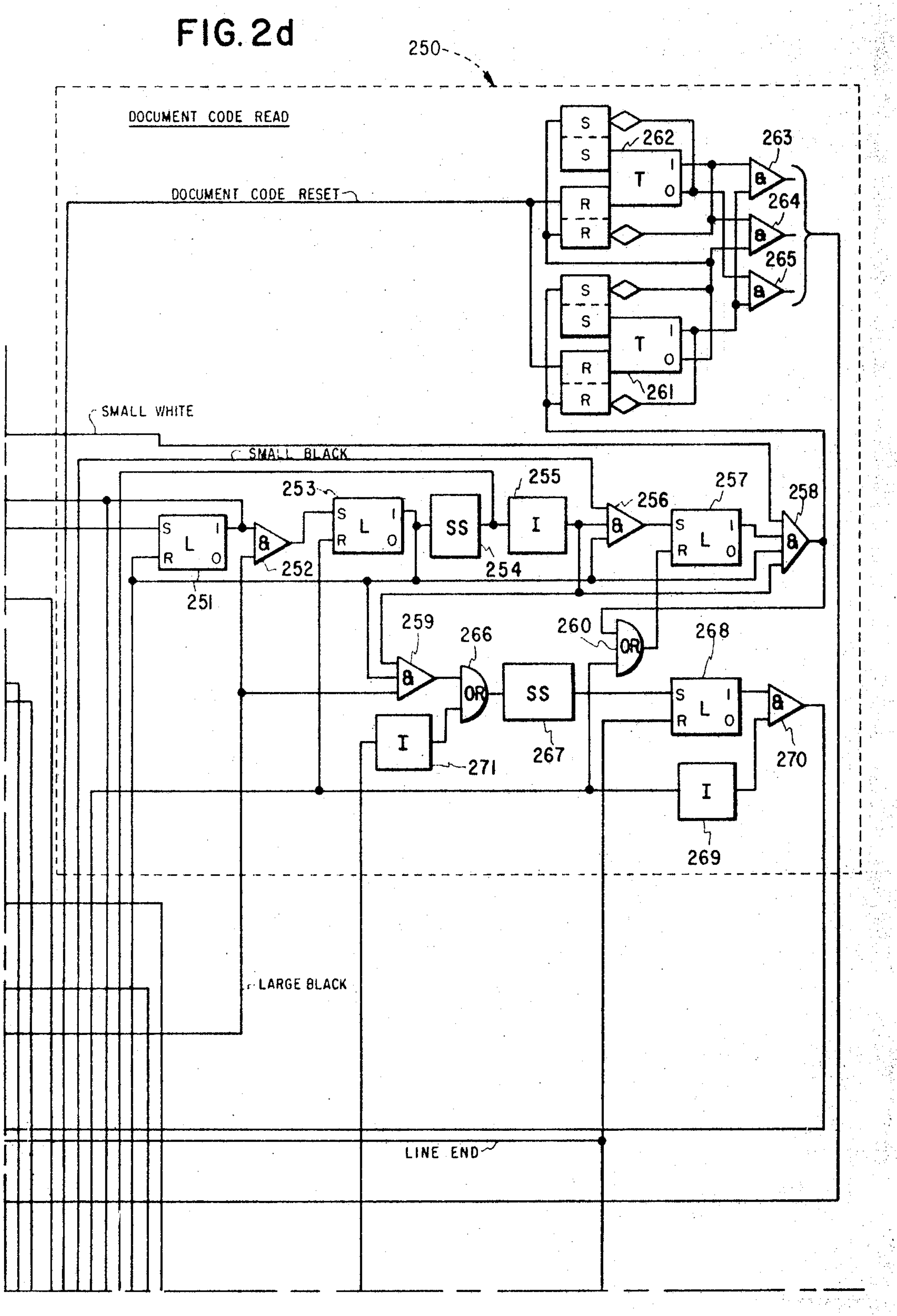
Figure 2E:
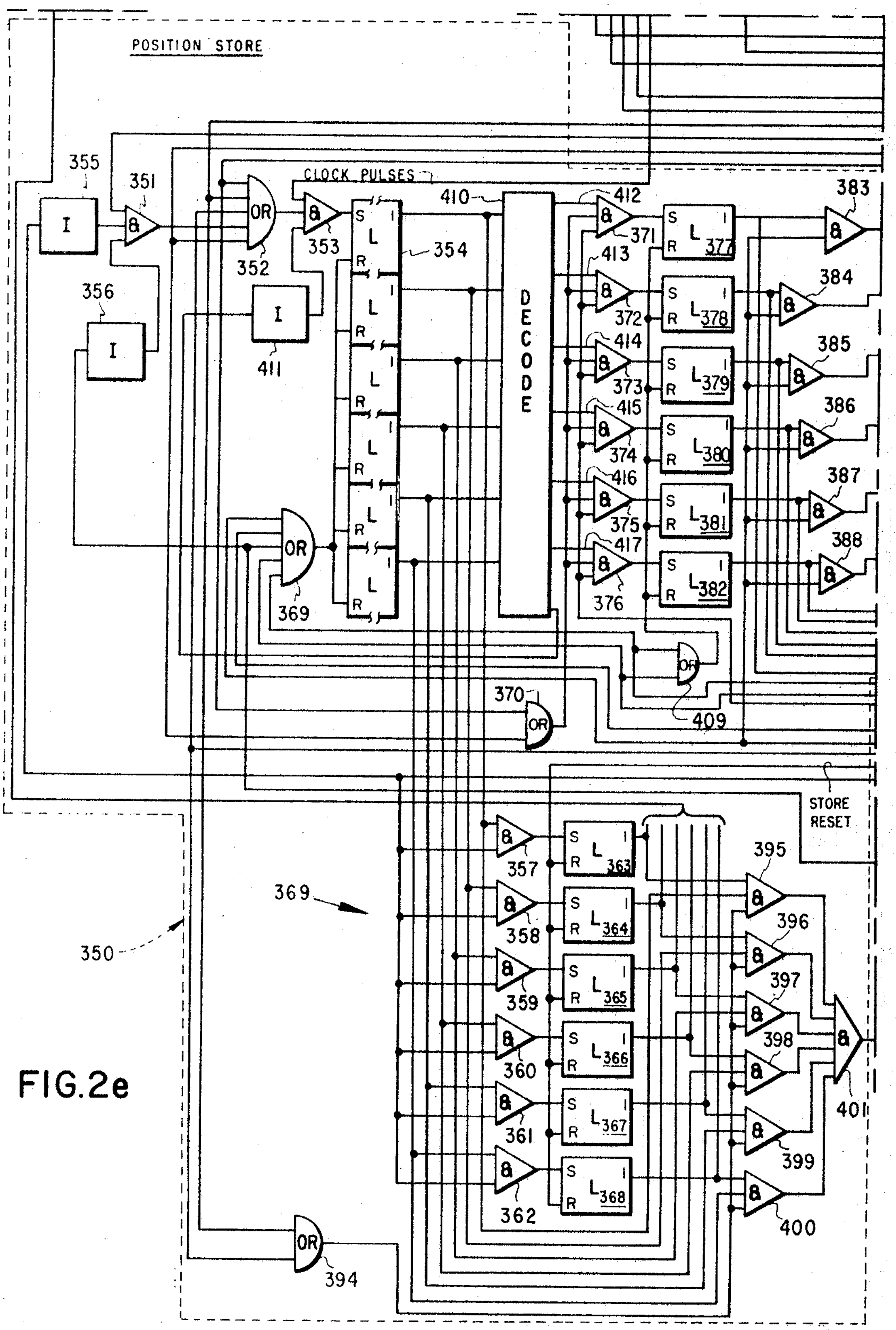
Figure 2F:
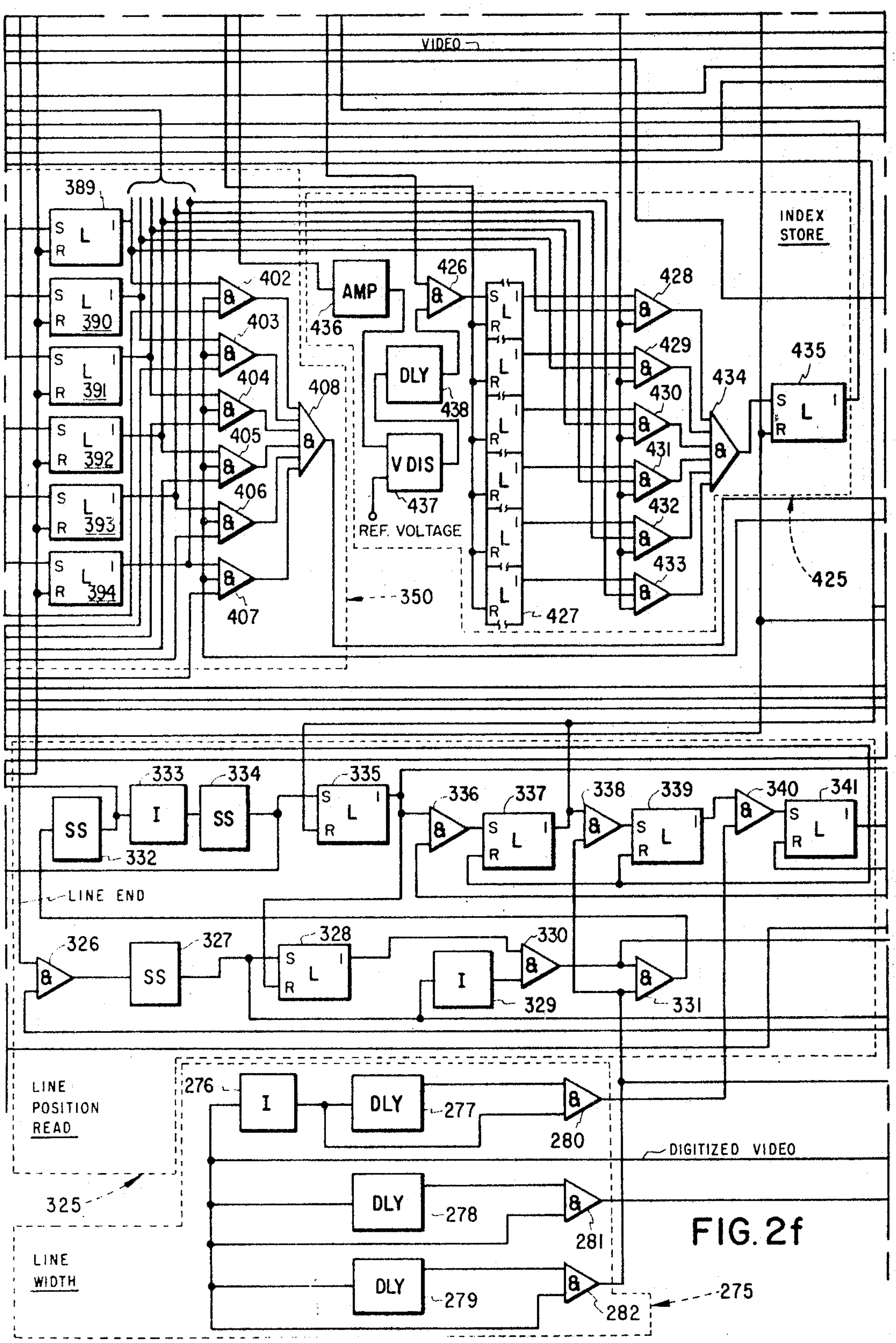
Figure 2G:
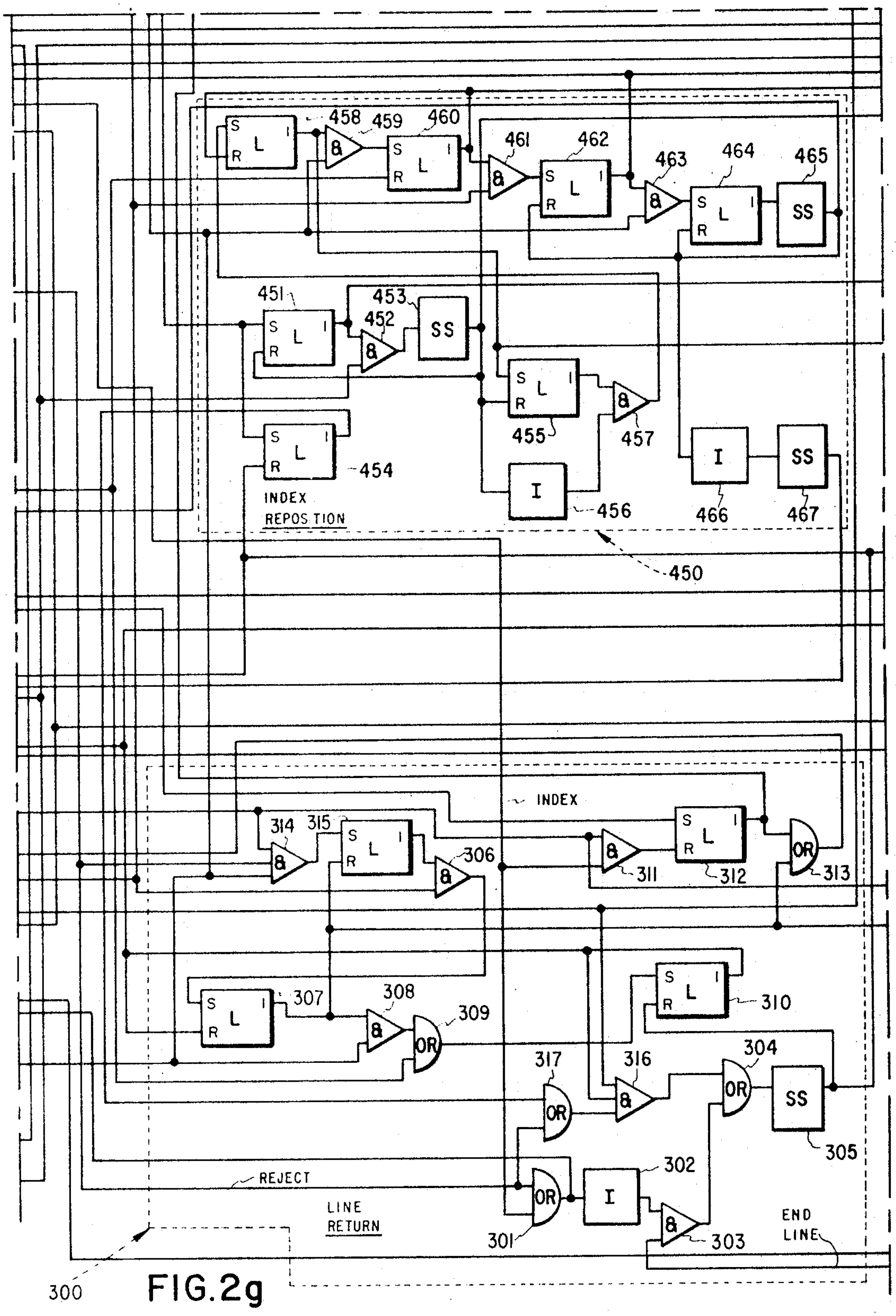
Figure 2H:
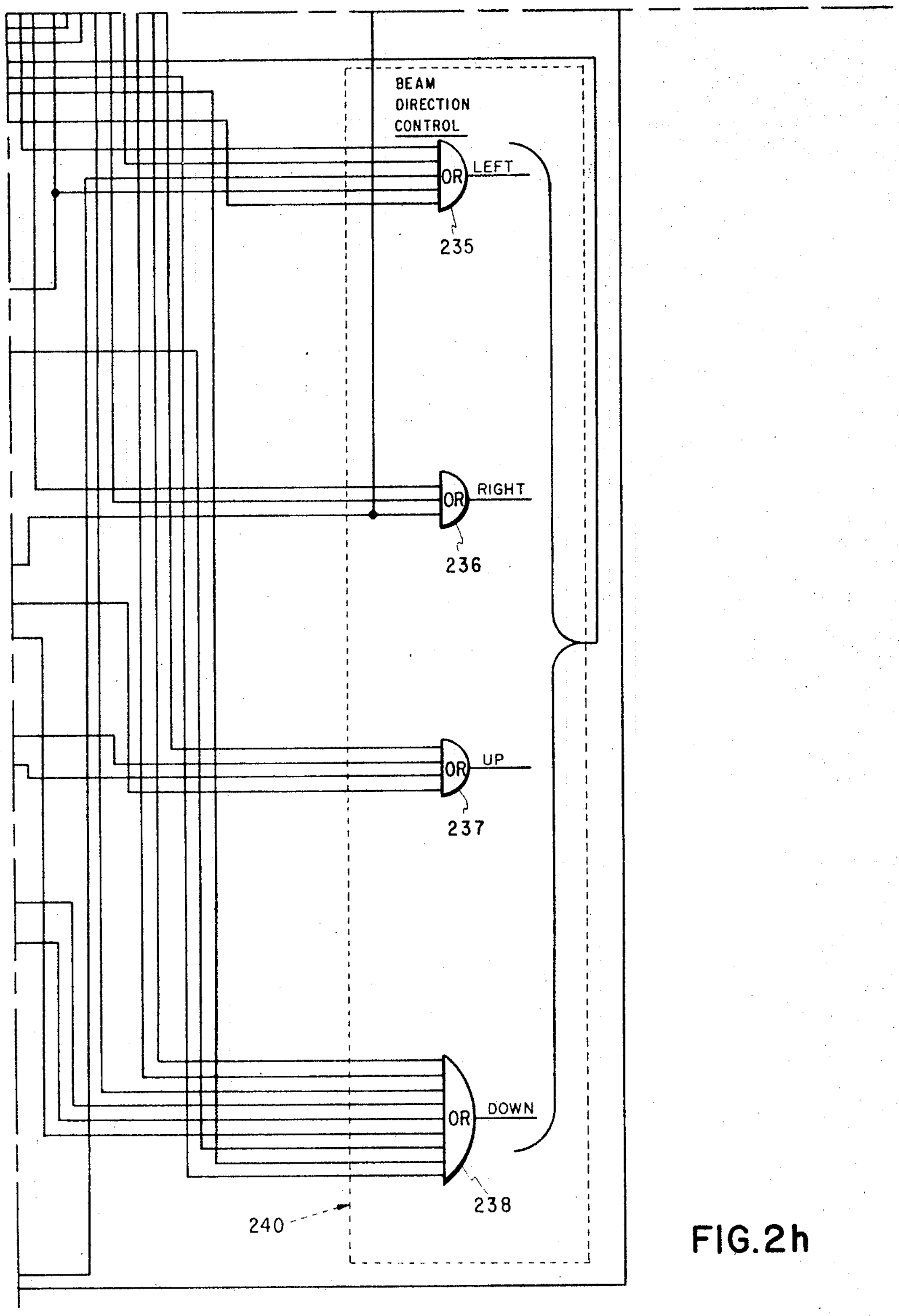

A block diagram for the first embodiment of the invention is shown in FIG. 1. The document transporting apparatus is not shown; however, the controls over this apparatus are represented by block 81. The document transporting apparatus itself does not form a part of this invention. There are several types of prior art devices suitable for the document transporting purpose. Generally speaking, any document transport apparatus which can be started and stopped under control of electrical signals would be suitable. Of course, the transport apparatus would necessarily have to accomodate documents of a particular size. Document transports controlled by hydraulic or mechanical clutches have been found suitable. A document transport of the type shown in U.S. Patent 3,179,404, dated Apr. 20, 1965, for Document Transporting Apparatus, is generally suitable.

As a document such as document 10 comes into the reading station, it will be stopped with the beginning of the information field within the scan window. This initial stopping of the document is under transport control circuitry 200.

Initial document stopping

With reference to both FIGS. 1 and 2, transport feed control circuit 81 within control 80 first provides an Initial Feed Reset pulse for resetting triggers 202 and 203. Thereafter, transport feed control 81 provides an Initial Feed gating signal to logical AND circuit 201 which has its output connected to the set inputs of triggers 202 and 203. Trigger 203, however, cannot be set until trigger 202 has been set. This is because the set output of trigger 202 is connected to condition trigger 203 for setting. The set output of trigger 203 is connected to an input of logical OR circuit 204 which has its output connected to an input of the transport feed control 81 of control 80 to provide a Stop signal thereto for stopping the document transport with the document 10 registered within the reading station.

The Initial Feed signal from transport feed control 81, of course, only conditions logical AND circuit 201 and it is only one of two conditioning signals. The other conditioning input to logical AND circuit 201 is connected to the reset output of trigger 203. Hence, logical AND circuit 201 will pass a signal only if there is an Initial Feed signal from transport feed control 81 and trigger 203 is in the reset condition. The signal passed by logical AND circuit 201 is developed by sensor 31 reading horizontal bars 30 and 29 respectively. The output of the light sensitive element 33 is connected to the input of amplifier 210 which has its output connected to an input of voltage discriminator 211. Voltage discriminator 211 has a reference voltage input connected to control 80. By this arrangement, extraneous marks or noise signals will not be mistaken for the horizontal bars 30 and 29 because the voltage discriminator 211 will pass a signal to delay 212 only if the signal from amplifier 210 is greater than the reference voltage from control 80. The output of delay 212 is connected to an input of logical AND circuit 201. The reason for incorporating delay 212 into the circuit is to provide precise stopping of the document. The period of delay 212 can be adjusted so as taken into account the inertia of the document transport.

Thus, as the document moves into reading position, light sensitive element 3 of detector 31 senses horizontal bar 30 which is printed at the leading edge of a document. The signal generated by light sensitive element 3 is amplified by amplifier 210 to a level whereby voltage discriminator 211 will pass a signal at its output to delay 212. The delayed signal is then passed by logical AND circuit 201 to set trigger 202. Trigger 203 will not be set at this time because it will not have been conditioned for setting since trigger 202 had been in the reset state at the time logical AND circuit 201 passed a signal. Light sensitive element 33 will generate another signal as it detects the presence of horizontal bar 29. This signal will be amplified by amplifier 210 to a level whereby voltage discriminator 211 will pass a signal at its output to delay 212. A delayed signal will again be passed by logical AND circuit 201 to set the trigger 203 which is conditioned to be set at this time by the set output of trigger 202. With trigger 203 set, logical OR circuit 204 will pass a Stop signal to transport feed control 81 for stopping the document transport.

It should be noted that until trigger 203 is reset by the Initial Feed Reset signal from control 80, logical AND circuit 201 is no longer conditioned to pass a signal. The reason for incorporating triggers 202 and 203 into the transport stop control circuit 200 is to provide positive stopping of the document at the proper position within the reading station. This is assured by having preprinted mark 30 at the leading edge of the document. Without the preprinted mark 30 it is possible that the leading edge of the document would develop a shadow which would be mistaken by light sensitive element 33 as the initial stop bar 29. Consequently, the document would be stopped at the wrong position within the reading station. However, by printing horizontal bar 30 at the leading edge of the document, a signal is always generated as light sensitive element 33 detects this mark. However, this signal does not generate the stop signal but only conditions trigger 203 for generating the stop signal upon light sensitive element 33 detecting the initial stop bar 29.

With the document 10 stopped at the initial position within the reading station, the beam of the cathode ray tube 90 is positioned to its home position which then corresponds to position 35 on document 10.

Beam initialization

By locating the beam to the home position which corresponds to position 35 when the document is initially stopped within the reading station, a starting point is provided from which field identification bar 27 can be found. After locating the field identification bar 27, the document code 25 is read.

The beam is initialized by the beam initialize control circuitry 225. The beam initialize control circuitry 225 is activated by the Stop signal passed by logical OR circuit 204. The output of logical OR circuit 204 is connected to an input of delay 226 which has its output connected to a set input of trigger 227. Delay 226 permits the document to settle down within the scanning window after having been stopped before starting beam initialization. The set output of trigger 227 is connected to input logical AND circuits 228, 234 and 244, and to the set inputs of triggers 229 and 230 respectively.

Logical AND circuit 228 has its other input connected to an output terminal 232 of voltage discriminator 231. The terminal 232 is also connected to the reset input of trigger 229. An output signal is passed by terminal 232 to condition logical AND circuit 228 and to reset trigger 229 if the beam of the cathode ray tube 90 is to the right of the home position. Thus, logical AND circuit 228 will pass a signal for directing the beam horizontally to the left if the beam is to the right of the home position. The output of logical AND circuit 228 is connected to an input of logical OR circuit 235 of beam direction control circuit 240. The output of logical OR circuit 235 is connected to the input of the beam deflection circuit 83 to drive the beam horizontally to the left.

Voltage discriminator 231 also has an output terminal 233 connected to condition the set input of trigger 229 and to condition logical AND circuit 234. Thus, trigger 229 will be set if there is an output from terminal 233 of voltage discriminator 231 when trigger 227 is set. The set output of trigger 229 passes a signal for deflecting the beam horizontally to the right. The set output of trigger 229 is connected to an input of logical OR circuit 236 of the beam direction control circuit 240. The output of logical OR circuit 236 is connected to an input of the beam deflection circuit 83 for driving the beam horizonally to the right. The reset output of trigger 229 is connected to an input of logical AND circuit 234. Voltage discriminator 231 has its inputs connected to outputs of the beam deflection circuit 83 of control 80 corresponding to the horizontal deflection voltage and the horizontal home voltage. Hence, if at the time trigger 227 is set, the beam were to the left of the home position, trigger 229 would be set and the beam would then move to the right until voltage discriminator 231 detects the beam arriving at a position which corresponds to the horizontal home voltage. The voltage discriminator 231 then changes state so there is an output at its terminal 232 and thus trigger 229 is reset and logical AND circuit 228 is conditioned to pass a signal to logical OR circuit 235 whereby the beam is directed horizontally to the left. The voltage discriminator 231 would again change state and there will be an output on terminal 233 for conditioning trigger 229. Trigger 229, however, will not turn ON at this time because a pulse will not be received from trigger 227 which is already on. Additionally, logical AND circuit 228 is no longer conditioned and therefore, the beam will not be directed either to the right or left. By the arrangement just described, there is assurance that the beam always approaches the home position horizontally from the same direction in order to reduce over-shoot.

The trigger 230 which when set causes the beam to be driven vertically upward, is conditioned for being set when there is an output signal from terminal 242 of voltage discriminator 241. The voltage discriminator 241 has an output signal terminal 242 if the beam is below the home position. The terminal 242 is also connected to an input of logical AND circuit 234. The set output of trigger 230 is connected to an input of logical OR circuit 237 which passes a signal to the beam deflection circuitry 83 of control 80 for directing the beam upwardly. The voltage discriminator 241 also has an output terminal 243 which has an output when the beam is above the home position. The terminal 243 is connected to the reset input of trigger 230 and to an input of logical AND circuit 244 which also has an input connected to the set output of trigger 227. The output of logical AND circuit 244 is connected to an input of logical OR circuit 238 which has its output connected to the beam deflection circuitry 83 of control 80 to drive the beam downwardly. The inputs to the voltage discriminator 241 are connected to the beam deflection circuitry 83 of control 80 to receive the vertical deflection voltage and the vertical home voltage respectively. It is thus seen that if at the time the trigger 227 is set, the beam is below the home position, voltage discriminator 241 will have an output at its terminal 242 and trigger 230 becomes set whereby it provides an output signal at its set output for driving the beam upwardly to the home position. When the beam reaches the home position, voltage discriminator 241 switches state so that there is an output from its terminal 243. This output signal resets trigger 230 and is passed by the logical AND circuit 244 to drive the beam downwardly. As the beam goes below the vertical home position, the voltage discriminator 241 again switches state whereby there is an output signal at terminal 242. Trigger 230, however, would not again be set because there would not be a pulse from trigger 227.

The reset output of trigger 230 is connected to an input of logical AND circuit 234. All inputs into logical AND circuit 234 are satisfied when the beam is in the home position. This is because the trigger 227 is set, the triggers 229 and 230 are reset and the voltage discriminators 231 and 241 are switched to the state whereby there are outputs from terminals 233 and 242 respectively. The output of logical AND circuit 234 is connected to an input of a logical AND circuit 245 which also has an input connected to the output of an inverter 246 the same having its input connected to the set output of latch 207 of the transport stop control circuit 200. The function of latch 207 is to provide an Index Read signal when the latch is set. Latch 207 is set during an indexing operation which will be described later herein. Hence, logical AND circuit 245 will be conditioned only if the operation is not an indexing operation. The output from logical AND circuit 245 provides an indication that the beam is in the home position. With the beam in the home position, the document code 25 can be read.

Reading the document code

The document code is read by first directing the beam from its home position to the right until it engages field identification bar 27. The beam is then reversed to the left a predetermined distance to assure that it is not in the field identification bar 27 when reading the document code. As the beam is directed to the left, it is also directed downwardly. The beam then continues in its downward movement until the document code 25 has been read.

The reading of the document code 25 is under control of the document code read circuitry 250. The output of logical AND circuit 245 of beam initialize control circuit 225 is connected to the set input of latch 251 of document code read circuitry 250. The set output of latch 251 is connected to an input of logical AND circuit 252 and to inputs of logical OR circuits 236 and 248. The output of logical OR circuit 236, it will be recalled, is connected to the beam deflection circuitry 83 of control 80 to drive the beam to the right. The output of logical OR circuit 248 is connected to the reset input of trigger 227. Thus, with latch 251 set, the trigger 227 is reset and the beam is driven to the right. The beam moves to the right until it engages the field identification bar 27. This is determined by means of the line width circuit 275. Line width is essentially determined by the amount of time it takes for the beam to travel across a line. Usually, the beam does not have to travel across the entire line before knowing that the line is a field identification bar and nothing else. Further, the fact that the beam has engaged a line such as the field identification bar 27 is ascertained by a change in the video signal as detected by the photomultiplier tube 95. The output of the photomultiplier tube 95 is connected to the video circuits 84 of control 80. The video circuits 84 shown in block form only, are quite conventional and include a video amplifier, a contrast and clipping circuit, and a video quantizing and digitizing circuit.

The digitized video output is taken from control 80 and connected to inputs of inverter 276, delays 278 and 279 and logical AND circuits 281 and 282 of line width circuit 275. The output of inverter 276 is connected as an input to delay 277 and to logical AND circuit 280. The output of logical AND circuit 280 signifies a small white condition. The outputs of delays 278 and 279 are connected to inputs of logical AND circuits 281 and 282 respectively. The outputs from logical AND circuits 281 and 282 indicate small and large black conditions respectively. It is thus seen that if the beam has been in white for a period of time as determined by delay 277, a small white signal is passed by logical AND circuit 280. If the beam is in black for a time determined by delay 278, then logical AND circuit 281 develops a small black signal and if the beam is in black for a time determined by delay 279, logical AND circuit 282 develops a large black signal.

The output of logical AND circuit 282 for passing the large black signal is connected to inputs of logical AND circuits 252 and 259 of the document code read circuitry 250. Thus, when the beam has detected the field identification bar 27, in response to the beam being moved to the right due to the setting of latch 251, latch 253 which has its set input connected to the output of logical AND circuit 252 is set. The set output of latch 253 is connected to an input of logical OR circuit 238, to the input of singleshot multivibrator 254 and to the reset input of latch 251. By this arrangement, the beam no longer moves to the right because latch 251 becomes reset; however, it does move downward due to the signal passed by logical OR circuit 238 with latch 253 set. The beam also moves to the left because the output of singleshot multivibrator 254 is connected to an input of logical OR circuit 235. The output of singleshot multivibrator 254 is also connected to an input of an inverter 255 which has its output connected to inputs of logical AND circuits 256, 258 and 259. Thus, when the singleshot multivibrator 254 times out, logical AND circuits 256, 258 and 259 are all conditioned and the beam is no longer moving to the left but only vertically downward.

The beam is now moving through the document identification code 25 and after engaging a code bar 26, a small black signal is passed by logical AND circuit 281. Logical AND circuit 256 is conditioned at this time by latch 253 to pass the small black signal received from logical AND circuit 281 to set latch 257 which has its set input connected to the output of logical AND circuit 256. The set output of latch 257 is connected to an input of logical AND circuit 258 which among the other inputs previously mentioned also has an input connected to the output of logical AND circuit 280 for receiving a small white signal. A small white signal is developed as the beam leaves the first code bar 26 and moves into white before it engages the second code bar 26. The output of logical AND circuit 258, is connected to the set and reset inputs of trigger 261 and to an input of a logical OR circuit 260 which has its output connected to the reset input of latch 257. Hence, the small white signal will be passed by logical AND circuit 258, to switch trigger 261 and to reset latch 257.

Trigger 261 forms a binary counter with trigger 262. The set output of trigger 261 is connected to condition its reset input and to inputs of logical AND circuits 263 and 265. The reset output of trigger 261 is connected to condition its set input, to the input of logical AND circuit 264 and to the set and reset inputs of trigger 262. The set output of trigger 262 is connected to inputs of logical AND circuits 263 and 264 and to its reset input to condition the same for being reset. The reset output of trigger 262 is connected to its set input for conditioning the same for being set and to an input of logical AND circuit 265. Triggers 261 and 262 have their DC reset inputs connected to control 80 for receiving a document code reset signal. Since the triggers 261 and 262 are initially reset, then when logical AND circuit 258 passes a small white signal, trigger 261 initially becomes set. With trigger 261 set, it is conditioned for being reset and logical AND circuits 263 and 265 are conditions to pass a signal. However, at this time, since trigger 262 is in its reset state, only logical AND circuit 265 is conditioned to pass a signal. The outputs of logical AND circuits 263, 264 and 265 indicative of binary document code number are connected to a central processing unit 85 of control 80.

As the beam continues downward through the document code, it will either engage a second code bar 26 or the bar 28 which indicates the end of the document code. If another code bar 26 is detected by the beam, then a second small black signal is developed and logical AND circuit 256 sets trigger 257. Thereafter, upon the beam leaving the code bar 26 a small white signal is developed and logical AND circuit 258 passes a signal which this time will reset latch 257 and trigger 261. With trigger 261 becoming reset, trigger 262 becomes set. Logical AND circuit 264 will now be conditioned to pass a signal to the central processing unit 85 of control 80.

If this were not yet the end of the document code, then upon engaging additional code bars 26, the sequence of events would repeat whereby latch 257 would again be set and thereafter upon detecting a small white condition, logical AND circuit 258 would pass a signal for again setting trigger 261 and resetting latch 257. Both triggers 261 and 262 would then be set and logical AND circuit 263 would pass a signal to the central processing unit 85 of control 80.

The beam continues to move downwardly after the code bars 26 have been read and the indications have been entered into the central processing unit 85 of control 80. Upon the beam sensing the horizontal bar 28, a large black signal is developed and is passed by logical AND circuit 259 via logical OR circuit 266 to a singleshot multivibrator 267. The output of the singleshot multivibrator 267 is connected to the reset input of latch 253, an input of logical OR circuit 260, the set input of latch 268, to an input of inverter 269, and to an input of logical OR circuit 238. The output of inverter 269 is connected to an input of logical AND circuit 270 which also has an input connected to the set output of latch 268. Hence, upon the beam generating a large black signal as it passes through horizontal bar 28, singleshot multivibrator 267 is fired whereby latches 253 and 257 become reset, latch 268 becomes set and logical OR circuit 238 passes a signal to beam deflection circuitry 83 to drive the beam downward below the horizontal bar 28 a distance determined by the period of the singleshot multivibrator 267.

The beam is now below the document code 25 before starting a line search operation. With the singleshot multivibrator 267 timed out, logical AND circuit 270 is conditioned and passes a line search signal. This completes the document code read operations and the beam is now positioned in the information field to search for a line of information therein to facilitate the reading of characters after a line is found.

The output of logical AND circuit 270 is connected to search circuitry 82 of control 80. The search circuitry 82 does not form a part of this invention and therefore it will not be described. The operation thus continues in a line search mode until a line of information is detected. The beam is being rastered horizontally to the right while in the line search mode. The raster is then caused to center upon the line of information as the raster moves from left to right. The raster height is also normalized with respect to the height of the characters in the line of information. When the raster reaches the right hand end of the line of information, the operation switches into a character read mode and the characters are read successively from right to left. After the last character within the line has been read, the beam is adjacent to field bar 18 of the line identification track 15. The search circuit 82 of control 80 then generates a Line End signal which resets latch 268, the same having its reset terminal connected to control 80. If at this time an indexing or line identification were not to take place, then the beam is directed to the right and downward in search of a new line.

The search circuit 82 also conditions logical AND circuit 303 of line return circuit 300. Logical AND circuit 303 has another input connected to the output of an inverter 302 which has its input connected to the output of logical OR circuit 301. Logical OR circuit 301 has one input connected to receive a Reject Line signal from the central processing unit 85 of control 80 and another input connected to receive an Index signal from the beam deflection circuit 83 of control 80. Thus, if neither an Index nor a Reject Line signal is received from control 80, logical AND circuit 303 will pass the Line End signal to logical OR circuit 304 which has its output connected to the input of a singleshot multivibrator 305. The output of the singleshot multivibrator is connected to a reset input of a latch 310, to the input of an inverter 271, to the reset input of a latch 454, to inputs of logical OR circuits 369 and 409, and to an input of logical OR circuit 236. Hence, upon reaching the end of a line, after having been in a character read mode, control 80 develops a Line End signal which will fire single-shot multivibrator 305 in an indexing operation or a reject line operation is not to take place. With the firing of the singleshot multivibrator 305, the beam moves to the right a distance determined by the period of the singleshot multivibrator to be in the information field. Further, when the singleshot multivibrator 305 times out, inverter 271 passes a signal via logical OR circuit 266 to fire singleshot multivibrator 267. With singleshot multivibrator 267 fired, logical OR circuit 238 passes a signal to deflection circuitry 83 to move the beam downwardly a predetermined distance to the next probable line to be read and latch 268 becomes set. When singleshot multivibrator 267 times out, logical AND circuit 270 passes a Line Search signal to search circuitry 82 and the operation again switches into a line search mode. The operation then continues as previously described whereby the beam rasters from left to right in search of a new line of information. After a new line of information has been found, the raster will then be centered thereon and normalized to the height of the characters therein. Thereafter upon reaching the right-hand end of the line, the operation would switch into a character scan mode. After all the characters within that line have been scanned, the beam would again be adjacent to field bar 18 of the line position code track 15. The search circuit 82 would again develop a line search end signal.

If at this time an Index or Reject Line signal is also sent from control 80, logical OR circuit 301 will pass a signal to inhibit logical AND circuit 303 and to condition logical AND circuit 326 of line position read circuitry 325.

LINE POSITION IDENTIFICATION

A line position is identified to facilitate either line marking or document indexing. The output of the logical AND circuit 326 is connected to an input of singleshot multivibrator 327 which has its output connected to an input of logical OR circuit 235, to the set input of latch 328, and to the input of an inverter 329. When singleshot multivibrator 327 fires, this causes the beam to move a short distance to the left into the line identification track 15 and latch 328 becomes set. The set output of latch 328 is connected to an input of a logical AND circuit 330 which also has an input connected to the output of inverter 329. The output of logical AND circuit 330 is connected to an input of a logical AND circuit 331 and to an input of logical AND circuit 351 and to an input of the logical OR circuit 237. Thus with latch 328 set by the singleshot multivibrator 327, then after the singleshot multivibrator 327 times out, a signal is passed by logical AND circuit 330 to condition the logical AND circuits 331 and 351 and to drive the beam upward. Also, all of the inputs to logical AND circuit 351 are satisfied because a gate fine signal is not provided to inverter 355 nor is a reset 1 signal provided to inverter 356. The output of logical AND circuit 351 is connected to an input of logical OR circuit 352 which has its output connected to an input of logical AND circuit 353.

At this time the beam is starting to move upwardly and a fine or vernier measurement is to be made by gating clock pulses into a counter 354. Logical AND circuit 353 has its output connected to the input of a six position binary counter 354. Logical AND circuit 353 also has an input from control 80 for receiving clock pulses and an input connected to the output of an inverter 411. Inverter 411 has its input connected to an output from decode circuit 410 which signifies a count of 64. The decode circuit 410 has its input connected to the outputs of the binary counter 354. Since the counter 354 does not have any bits in it at this time, there will not be a signal on the decode line corresponding to a count of 64 and therefore logical AND circuit 353 will be conditioned to pass the clock pulses from the control 80. The clock pulses are of a frequency so as to provide a count of 63 as the beam travels from one bar 17 to the next bar 17. Thus, as the beam travels upward within the line identification track 15, clock pulses will be entered into counter 354 to develop the fine or vernier measurement of the distance that the beam travels upwardly until it engages the first bar 17.

When the beam engages the first bar 17 and travels therewithin, logical AND circuit 282 of the line width circuit 275 develops or passes a large black signal. The output of logical AND circuit 282 is connected to an input of logical AND circuit 331 of the line position read circuitry 325 which is conditioned at this time because there is an output from logical AND circuit 330. The output of logical AND circuit 331 is connected to the input of a singleshot multivibrator 332. Thus singleshot multivibrator 332 fires and develops a gate fine signal. The output of singleshot multivibrator 332 is connected to the inputs of inverters 333 and 355. Hence, when singleshot multivibrator 332 fires, logical AND circuit 351 is no longer conditioned and therefore clock pulses can no longer be gated into counter 354 via logical AND circuit 353. With the fine measurement made, as represented by the value in counter 354, then the value in counter is transferred to a latch buffer register to be available to the central processing unit 85 and to permit another fine measurement to be made to ascertain when the beam has returned to the level at which it entered the line identification track 15.

The output of the singleshot multivibrator 332 is also connected to inputs of logical AND circuits 357, 358, 359, 360, 361 and 362. These logical AND circuits have their outputs connected to set inputs of latches 363, 364, 365, 366, 367 and 368 respectively, which form a buffer storage register 369. The logical AND circuits 357, 358, 359, 360, 361 and 362 have inputs connected to the outputs of positions 1, 2, 4, 8, 16 and 32 respectively of binary counter 354. When singleshot multivibrator 332 times out, inverter 333 passes a signal to fire singleshot multivibrator 334. Singleshot multivibrator 334 upon being fired develops a Reset One pulse which sets latch 335 and is also applied to inverter 356 and logical OR circuit 369. Hence, logical AND circuit 351 remains deconditioned and logical OR circuit 369 passes the Reset One pulse to reset the counter 354. The beam continues to move upwardly because latch 335 has its set output connected to an input of logical OR circuit 237. The set output of latch 335 is also connected to the reset input of latch 328 and to an input of a logical AND circuit 336. Logical AND circuit 336 also has an input connected to the output of logical AND circuit 280 which upon being conditioned by delay 227 passes a small white signal.

Thus after the beam passes through the horizontal bar 17 it will pass into white and develope a small white signal. This signal is passed by logical AND circuit 336 to set latch 337. The output of latch 337 is connected to an input of logical OR circuit 237 and thus the beam still continues to move vertically upward. The output of latch 337 is also connected to the reset input of latch 335, to an input of logical AND circuit 338 and to an input of logical OR circuit 352. Therefore, logical OR circuit 352 passes a signal directly to condition logical AND circuit 353 which will then pass clock pulses to the counter 354. The set output of latch 337 is also connected to an input of logical OR circuitry 370 which has its output connected to inputs of logical AND circuits 371, 372, 373, 374, 375 and 376. The function of the output of logical OR circuit is to condition these logical AND circuits for sampling black information at discrete times while the beam moves between the first and second horizontal bars 17. Of course, as the beam moves between bars 17, it crosses bars 19. Consequently, the bars 19 will be read as they are traversed by the beam. It should be noted that since the beam will eventually be returned to the position it had upon entry into the line identification track 15, the bars 19 could be read either while the beam is moving upwardly or after the beam has been reversed upon detecting the second horizontal bar 17 and caused to move downwardly through the bars 19. In this particular instance, the bars 19 are read while the beam is moving upwardly and after the beam has passed through the first bar 17 and the small white signal has been detected. Further, there are six possible positions for the binary bars 19 between the horizontal bars 17. Thus there can be binary code bars 19 for the binary bits 1, 2, 4, 8, 16 and 32. It will be recalled that the space between any two horizontal bars 17 is time divided into sixty-three clock pulses.

The decode circuit 410 shown in block form only consists of logic circuits to develop discrete outputs for particular counts in counter 354. Decode 410 has output lines 412, 413, 414, 415, 416, 417 and 418 which correspond to the binary positions 1, 2, 4, 8, 16, 32 and 64 respectively. The outputs 412, 413, 414, 415, 416 and 417 are connected to inputs of logical AND circuits 371, 372, 373, 374, 375 and 376 respectively. These logical AND circuits each also have an input connected to the output of logical AND circuit 281 to receive a small black signal therefrom. The outputs of logical AND circuit 371, 372, 373, 374, 375 and 376 are connected to set inputs of latches 377, 378, 379, 380, 381 and 382, respectively. By this arrangement it is possible to determine whether a code bar 19 represents a binary 1, 2, 4, 8, 16 or 32.

There is an output signal on conductor 312 whenever counter 354 has a count of 8, 9 or 10. Therefore, if a small black signal is present during the counts of 8, 9 or 10, logical AND circuit 371 passes a signal to set latch 377. Of course, a small black signal will or will not be present depending upon whether the beam has engaged a binary code bar 19. As the beam continue to move upward, clock pulses continue to enter counter 354 and if the beam engages a code bar during the counts of 17, 18 or 19, logical AND circuit 372 passes a signal to set latch 378. The sampling of the binary code bar positions continues until the beam engages the second horizontal bar 17 and travels there within.

When the beam travels within the second horizontal bar 17, a large black signal is developed. The output of logical AND circuit 282 of the line width circuit 275 is also connected to an input of logical AND circuit 338 of the line position read circuitry 325. Hence, since latch 337 is still set, logical AND circuit 338 passes a signal to set latch 339. The counter 354 continues to count. However, when a count of 64 is reached, logical AND circuit 353 is deconditioned and consequently no additional clock pulses will be entered into counter 354 until the counter 354 is reset and the logical AND circuit 353 again becomes conditioned.

The set output of latch 339 is connected to an input of logical AND circuit 340 which has another input connected to the output of logical AND circuit 280 to receive a small white signal therefrom. Therefore, after the beam passes through the second horizontal bar 17 a small white signal is developed and logical AND circuit 340 passes a signal to set latch 341. The set output of latch 341 is connected to reset inputs of latches 337 and 339. Consequently, these latches become reset at this time. With latches 337 and 339 reset, the beam no longer moves upwardly. Further, the set output of latch 341 is connected to inputs of logical AND circuits 311 and 314 of the line return circuitry 300; to inputs of logical AND circuits 383, 384, 385, 386, 387, and 388 and to an input of logical OR circuit 369 of the position store circuitry 350 and to an input of logical OR circuit 238 of the beam deflection control circuit 240. Because of the connection to the logical OR circuit 238, the beam is directed downwardly. Further, the signal passed by logical OR circuit 369 resets the counter 354.

The logical AND circuits 383, 384, 385, 386, 387 and 388 which are conditioned by the set output of the latch 341 also have inputs connected to the set outputs of latches 377, 378, 379, 380, 381 and 382 respectively. The outputs of logical AND circuits 383, 384, 385, 386, 387 and 388 are connected to set inputs of latches 389, 390, 391, 392, 393 and 394 respectively. Hence, the binary code for the coarse measurement which is represented by the condition of latches 377, 378, 379, 380, 381 and 382 is transferred upon setting of latch 341 to the latches 389, 390, 391, 392, 393 and 394. The binary value for the coarse position in latches 389, 390, 391, 392, 393 and 394 and the binary value for the fine position stored in latches 363, 364, 365, 366, 367 and 368 are transferred to data storage within the central processing unit 85 of control 80 to be available for future use and in this particular instance for line marking after the document has moved out of the reading station.

After having read the coarse position code the beam continues to move downward and engages a bracket bar 17 to developed a large black signal. Since latch 341 is still set and the operation is in a reject line mode, logical AND circuit 314 of the line return circuit 300 passes a signal to set latch 315. After the beam passes through the horizontal bar 17 while moving downwardly, a small white signal is developed and passed by logical AND circuit 306 which, conditioned by latch 315, passes a signal to set latch 307. The set output of latch 307 continues to send the beam downward via the logical OR circuit 238. The set output of latch 307 also resets latch 315, conditions logical AND circuit 308 and is passed by logical OR circuit 313 to reset latch 341. It should be noted that although latch 341 becomes reset at this time the beam continues to move downwardly under control of latch 307.

When the beam engages the next horizontal bar 17, which is the first horizontal bar engaged by the beam while moving upwardly, logical AND circuit 308 passes a signal via logical OR circuit 309 to set latch 310. With latch continues to move downwardly but now under the control of latch 310. The beam will move downwardly from the horizontal bar 17 a distance equal to the fine measurement. The set output of latch 310 is also connected to an input of logical OR circuit 352 and thus logical AND circuit 353 becomes conditioned to pass clock pulses to counter 354. The set output of latch 310 is also connected to an input of logical OR circuit 394 which has its output connected to inputs of logical AND circuits 395, 396, 397, 398, 399 and 400. These logical AND circuits also have inputs connected to the set outputs of positions 1, 2, 4, 8, 16, 32 of counter 354 and to the set outputs of latches 363, 364, 365, 366, 367 and 368, respectively. Thus, these logical AND circuits function to compare the values stored in the latches 363, 364, 365, 366, 367 and 368 with a value now being developed in the counter 354 so as to provide a signal when the two values are equal which indicates that the beam has arrived at the same level at which it entered the line position identification track 15.

The outputs of logical AND circuits 395, 396, 397, 398, 399 and 400 are connected to inputs of a logical AND circuit 401. The output of logical AND circuit 401 is connected to inputs of logical AND circuits 205 and 316. Logical AND circuit 316 also has inputs connected to the set output of latch 310 and the output of logical OR circuit 317. Thus, when the beam arrives at at its entry level into the line position identification track 15, logical AND circuit 316 passes a signal via logical OR circuit 304 to fire the singleshot multivibrator 305. This causes latch 310 to become reset thus stopping the downward motion of the beam. Further, the beam moves to the right because singleshot multivibrator 305 passes a signal to logical OR circuit 236. The output of the singleshot multivibrator 305 is also connected to an input of logical OR circuit 369 and therefore when singleshot multivibrator 305 fires, counter 354 is reset. Additionally, the output of singleshot multivibrator 305 is connected to an input of logical OR circuit 409 the same having its output connected to the reset inputs of latches 377, 378, 379, 380, 381 and 382 which then become reset. It should also be noted that control 80 provides a Store Reset signal after the fine and coarse measurements have been entered into the storage of the central processing unit 85. This signal resets latches 363, 364, 365, 366, 367, 368, 389 390, 391, 392, 393 and 394.

Logical AND circuit 205 is not conditioned at this time; however, when the singleshot multivibrator 305 times out, inverter 271 passes a signal via logical OR circuit 266 to fire the singleshot multivibrator 267. With singleshot multivibrator 267 fired, the beam will move downwardly to the next probable line to be read. Latch 268 also becomes set and when the singleshot multivibrator 267 times out, logical AND circuit 270 will pass a Line Search signal to search circuit 82 of control 80 and the operation switches into a line search mode.

It should be noted that a line position is identified in the same manner for a reject line operation as for an indexing operation. However, the events that take place after a line position has been identified are different for a reject line operation than for an index operation. When a line position is identified for a reject line operation, then after the line position information has been stored, the operation switches into a line search mode. On the other hand, if the line position were identified for purposes of an index operation, then the beam would be either blanked or switched into an aging mode and the document would be advanced or indexed an amount determined by a distance that the identified line position is away from the upper edge of the scan window. After the document has been indexed, the beam is positioned into the line identification track 15 to find the line that had been previously identified prior to indexing. Thereafter the operation switches into a line search mode. The details of document indexing will now be described.

DOCUMENT INDEXING

When the document initially enters the reading station, control 80 provides an Index Set pulse which resets or initializes a six position binary counter 427 to an initial value corresponding to the number of coarse horizontal bars that sensor 38 is away from the required stop location within the scan window. Control 80 also provides a Document Ready signal which is present for the entire time that the document is in the reading station. The document ready signal is applied from control 80 to a logical AND circuit 426 which has its output connected to the input of binary counter 427. Logical AND circuit 426 also has an input connected to the output of a delay 438 having its input connected to the output of a voltage discriminator 437. The voltage discriminator 437 has an input connected to the output of an amplifier 436 and an input connected to a voltage reference potential. The input of amplifier 436 is connected to the output of detector 38. The voltage discriminator 437 requires that the signal detected by detector 38 and amplified by amplifier 436 be at least at a level which would be indicative of sensing a horizontal bar 16 or 17 before it will generate an output signal.

When an indexing operation is to take place, control 80 provides an Index signal which is applied to logical AND circuit 311 and logical OR circuit 301. Logical AND circuit 311 does not pass a signal until latch 341 is set. Of course, it will be recalled that latch 341 is set only after the coarse and fine measurements have been made for the last line read prior to indexing. Additionally, it will be recalled that the signal passed by logical OR circuit 301 is applied to logical AND circuit 326 whereby the beam is moved into the line identification track under control of singleshot multivibrator 327 for purposes of identifying the line position. Hence, when latch 341 is set, the input conditions to logical AND circuit 311 are satisfied and latch 312 becomes set. The output of latch 312 is connected to the transport feed circuit 81 of control 80 whereby the document transport is started. The document transport then advances the document until it is stopped. It should be noted that the latch 312 also causes the resetting of latch 341 via logical OR circuit 313.

The set output of latch 312 is also connected to an input of logical AND circuit 205 of the transport stop control circuit 200 and to inputs of logical AND circuits 428, 429, 430, 431, 432 and 433 of the index store circuit 425. Logical AND circuit 205, it will be recalled, also has an input connected to the output of logical AND circuit 401 which has an output when the value in counter 354 equals the value stored in latches 363, 364, 365, 366, 367 and 368. The output of logical AND circuit 205 is connected to an input of logical OR circuit 204 which has its output connected to feed circuit 81 to provide a stop signal thereto. Hence, the document transport stops the document when logical AND circuit 205 passes a signal. The output of logical AND circuit 205 is also connected to the input of a singleshot multivibrator 206 which has its output connected to the set input of a latch 207, to the reset input of latch 312, to an input of logical OR circuit 369 and to the reset terminal of a latch 435. This arrangement provides for resetting the logic used during indexing and sets up for an index reposition operation.

To further understand the document indexing operation, it should be noted that as the document moves relative to the reading station, sensor 38 senses the horizontal bars 16 and 17 successively. For each horizontal bar 16 or 17 sensed a signal is passed via amplifier 436, voltage discriminator 437, delay 438 and logical AND circuit 426 to counter 427. The value in counter 427 is compared with the coarse position for the last line read prior to indexing by means of the logical AND circuits 428, 429, 430, 431, 432 and 433. These logical AND circuits are conditioned by the index read signal from latch 312 of the line return circuitry 300.

The outputs of logical AND circuits 428, 429, 430,

431, 432 and 433 are connected to inputs of a logical AND circuit 434. The output of logical AND circuit 434 is connected to the set input of a latch 435. Thus, when a number of horizontal bars 16 and 17 have been counted which equals the stored coares position value for the last line read prior to indexing, latch 435 is set. The set output of latch 435 is connected to an input of logical OR circuit 352. Hence, when latch 435 is set, logical AND circuit 353 is conditioned to pass clock pulses into counter 354. By this arrangement, a fine measurement is started after the newly developed coarse measurement equals the stored coarse measurement. Further, this new fine measurement will continue to be made until it equals the stored fine measurement. The value in counter 354 is compared with the value in latches 363, 364, 365, 366, 367 and 368 by means of the logical AND circuits 395, 396, 397, 398, 399 and 400 which is conditioned at this time because the set output of latch 435 is also connected to an input of logical OR circuit 394. When the two values are equal, logical AND circuit 401 will pass a signal to logical AND circuits 205 and 316.

The logical AND circuit 205, which as it will be recalled also has an input connected to the output of latch 312, will pass a signal via logical OR circuit 204 to transport feed circuit 81 to stop the document transport. Additionally, singleshot multivibrator 206 is fired by a signal from logical AND circuit 205 thus developing a reset 2 signal which is applied to set latch 207 and reset the latches 312 and 435 and the counter 354. The set output of latch 207 provides an index read 2 signal which conditions logical AND circuit 247. Further, the signal passed by logical OR circuit 204 sets trigger 227 via delay 226 and the beam becomes re-initialized in a manner as described for beam initialization. Thus, with trigger 227 set, logical AND circuit 247 passes a signal after the beam has been reinitialized which will initiate an index reposition operation.

INDEX REPOSITION

After indexing takes place the last line read prior to indexing must be relocated in order to continue a document reading operation. Thus, after the beam has been reinitialized to its home position it is moved therefrom to the left into the line identification code track 15.

It is seen that logical AND circuit 247 will be satisfied when latch 207 has been set and the beam has been initialized. The output of logical AND circuit 247 is connected to the set inputs of latches 451 and 454. The set output of latch 451 is connected to an input of a logical AND circuit 452 and to inputs of logical OR circuits 235 and 248. This causes the beam to move to the left and reset the trigger 227. Additionally, logical AND circuit 452 becomes conditioned. Logical AND circuit 452 also has an input connected to an output of logical AND circuit 281 and its output is connected to the input of singleshot multivibrator 453. Therefore, when logical AND circuit 281 passes a small black signal, singleshot multivibrator 453 fires. The output of singleshot multivibrator 453 is connected to the set input of latch 455, to the reset input of latch 451, to the input of an inverter 456, and to an input of logical OR circuit 235. Hence, the beam continues to move to the left but now under control of the singleshot multivibrator 453, latch 455 becomes set and latch 451 becomes reset. The set output of the latch 455 is connected to an input of a logical AND circuit 457 which has another input connected to the output of the inverter 456 and its output is connected to the set input of latch 458. Thus, when the singleshot multivibrator 453 times out logical AND circuit 457 will pass a signal to set latch 458. The set output of latch 458 is connected to the reset input of latch 455, to an input of a logical AND circuit 459 and to an input of logical OR circuit 238. Thus with the setting of latch 458, the beam is directed downward and latch 455 is reset.

The logical AND circuit 459 has another input connected to the output of logical AND circuit 282 to receive a large black signal therefrom. The output of logical AND circuit 459 is connected to the set input of latch 460. Hence, as the beam moves downwardly it will engage a bracket bar 17 and travel therewithin to develop a large black signal. In response to receiving the large black signal, the logical AND circuit 459 will pass a signal to set latch 460. The set output of latch 460 is connected to the reset input of latch 458, to an input of logical AND circuit 461 and to an input of logical OR circuit 238. Because of the input into logical OR circuit 238, the beam continues to move downward even though latch 458 becomes reset. Logical AND circuit 461 also has an input connected to the output of logical AND circuit 280 to receive small white signal therefrom. Therefore, when the beam emerges from the bracket bar 17 into the white area therebeneath, logical AND circuit 461 passes a signal to set the latch 462. The set output of latch 462 is used to initiate a coarse compare operation.

It should be noted that latch 460 remains set and therefore the beam is still moving downwardly under control of latch 460 and latch 462 which also has its set output connected to an input of logical OR circuit 238. The set output of latch 462 is also connected to an input of logical AND circuit 463 and to inputs of logical OR circuits 352 and 370. The input to logical OR circuit 352 permits the logical AND circuit 353 to pass clock pulses to counter 354. The input into logical OR circuit 370, of course, conditions the logical AND circuits 371, 372, 373, 374, 375 and 376 for decoding the weight or significance of the binary bars 19 as the beam moves downwardly relative thereto. The coarse position will be determined in the same manner as previously described except in this instance the beam is now moving downward whereas when identifying the line position previously it did so while moving upwardly. Hence, after the coarse position has been read, the value thereof is stored in latches 377, 378, 379, 380, 381 and 382. The previously measured coarse position is stored in latches 389, 390, 391, 392, 393 and 394. The set outputs of the latches 377, 378, 379, 380, 381 and 382 are respectively compared with the set outputs of latches 389, 390, 391, 392, 393 and 394 by means of logical AND circuits 402, 403, 404, 405, 406 and 407. These logical AND circuits are conditioned for the comparison operation by means of a signal from a singleshot multivibrator 465 which has its output connected to inputs thereof.

The singleshot multivibrator 465 has its input connected to the set output of a latch 464 which has its set input connected to the output of logical AND circuit 463. Logical AND circuit 463 has one of its inputs connected to the set output of latch 462 and has another input connected to the output of logical AND circuit 282 to receive a large black signal passed thereby. Hence, when the beam encounters a second bracket bar 17 while moving downwardly, a large black signal is developed to set latch 464. With latch 464 set, singleshot multivibrator 465 fires to condition the logical AND circuits 402, 403, 404, 406 and 407 to effect the comparison of the newly developed coarse code with the stored coarse code. If the two coarse measurements do not compare, logical AND circuit 461 will again be satisfied when a small white signal is developed as the beam passes out of the bracket bar 17 because latch 460 has not been reset. The reset input of latch 460 is connected to the output of a logical AND circuit 408 which only passes a signal when the two coarse codes compare equal. Logical AND circuit 408 has inputs connected to outputs of logical AND circuits 402, 403, 404, 405, 406 and 407. However, if the two coarse measurements do not compare equal, a sequence for making another coarse measurement repeats and another comparison operation takes place and this series of events continues until a presently measured coarse position compares equal with the stored coarse position.

It should be noted that the output of the singleshot multivibrator 465 is also connected to reset inputs of latches 462 and 464 and to an input of an inverter 466 which has its output connected to an input of a singleshot multivibrator 467. Hence, when the singleshot multivibrator 465 times out, the singleshot multivibrator 467 is fired. The output of the singleshot multivibrator 467 is connected to inputs of logical OR circuits 369 and 409. Hence, counter 354 and latches 377, 378, 379, 380, 381 and 382 are reset by a signal from the singleshot multivibrator 467.

When a coarse position being measured compares equal with the stored coarse position, logical AND circuit 408 is satisfied and its output is connected to the reset input of latch 460 and to an input of logical OR circuit 309. By these connections latch 460 is reset and the latch 310 becomes set and thus the beam continues to move downwardly. With latch 310 set, a signal is also passed by logical OR circuit 352 to condition logical AND circuit 353 whereby clock pulses are entered into counter 354 which has just been previously reset. Further, the signal on the set output of latch 310 is passed by logical OR circuit 394 to condition logical AND circuits 395, 396, 397, 398 and 400 to permit the same to compare the fine measurement stored in latches 363, 364, 365, 366, 367 and 368 with a fine measurement being made and entered into counter 354. When the fine measurement being made at this time equals the stored fine measurement, logical AND circuit 401 passes a fine compare signal to logical AND circuit 316. At this time, all the inputs to logical AND circuit 316 will now be satisfied because the latch 310 is set and latch 454 is still set and there is an output from logical AND circuit 401. The signal thus passed by logical AND circuit 316 fires singleshot multivibrator 305 via the logical OR circuit 304. This causes the beam to move to the right a distance determined by the period of the singleshot multivibrator 305. It also resets latch 454, the counter 354 and the latches 377, 378, 379, 380, 381 and 382.

When the singleshot multivibrator 305 times out, singleshot multivibrator 267 is fired via inverter 271 and logical OR circuit 266. This causes the latches 253 and 257 to be reset and latch 268 to become set. It also causes the beam to move down to the next probable line and when the singleshot multivibrator 267 times out, the input conditions to logical AND circuit 270 are satisfied whereby a line search signal is set to control 80 and the operation switches into a line search mode.

Although the details regarding line identification have been described, a line marking operation will now be described in detail.

LINE MARKING

Line marking takes place after the document leaves the reading station. The line marking device is only shown schematically and any suitable electrically controlled marking device can be used. For example, electromagnetically operated print hammers as used in high speed printers are suitable. All that is necessary is to make a mark in track 36 along side the line in error. The line marking device is located a fixed distance from the document reading station. Each line position to be marked has been previously identified while the document was in the reading station. These lines are identified in terms of coarse and fine measurements which have been stored in the central processing unit 85.

At the same time, the document is advanced from the reading station, control 80 develops an Initial Line Mark Reset signal for resetting counter 475 and a Line Mark signal which is present for the entire line marking operation. The Line Mark signal is applied to an input of logical AND circuit 474 of the line mark compare circuit 470. Logical AND circuit 474 also has another input connected to the output of a delay 473. The output of the logical AND circuit 474 is connected to an input of the six position binary counter 475.

Delay 473 has its input connected to the output of a voltage discriminator 472 the same having an input connected to the output of an amplifier 471 and an input connected to a reference voltage. The input of the amplifier 471 is connected to the output of light sensitive element 67 of sensor 65 located external to the reading station and in line to read the document identification track 15. Hence, as each bar 16 or 17 is read, an entry is made into counter 475.

The Line Mark signal from control 80 also conditions logical AND circuits 476, 477, 478, 479, 480 and 481 which have inputs connected to the binary outputs of the counter 475 and to the storage area of the central processing unit 85 which stores the coarse measurements for line marking. The outputs of the logical AND circuits 476, 477, 478, 479, 480 and 481 are connected to inputs of logical AND circuit 482 which has its output connected to the set input of latch 483.

The set output of the latch 483 is connected to an input of a logical AND circuit 484 which also has an input for receiving clock pulses from control 80. The output of logical AND circuit 484 is connected to an input of a six position binary counter 485. It is seen that counter 485 functions to develop a fine measurement after the coarse measurement made equals the coarse measurement in storage. This fine measurement is then compared with the fine measurement coming from storage within the central processing unit 85. This comparison is accomplished by means of logical AND circuits 486, 487, 488, 489, 490 and 491. These logical AND circuits are conditioned by the line mark signal from control 80. The outputs of these logical AND circuits are connected to inputs of logical AND circuit 492 which has its output connected to the set input of a latch 493. The set output of latch 493 is connected to the central processing unit 85 and to printer control circuit 86.

From the arrangement just described, it is seen that counter 475 develops a coarse count as the sensor 65 senses bars 16 and 17. This coarse count as it is being developed is compared with the coarse count furnished from the central processing unit 85. When there is comparison between the two coarse counts, logical AND circuit 482 sets latch 483. The set output of latch 483 conditions logical AND circuit 484 and clock pulses are entered into counter 485. The fine count developed in counter 485 is compared with the fine measurements stored in the central processing unit 85. When the two fine counts compare, logical AND circuit 492 passes a signal to set the latch 493. The signal from latch 493 is furnished to the central processing unit 85 and to the printer control circuit 86 which then provides a signal for operating a marking device or printer 70. The central processing unit 85 then sends a Fine Line Mark Reset signal to reset latch 493. Latch 483 and counter 485 are reset by a coarse line mark reset signal from control 80. This signal is provided by control 80 only if line marking for the coarse position has been completed.

Further it should be recognized that there can be more than one fine position for each coarse position. If this is the situation, the latch 483 and counter 485 are not reset and the central processing unit 85 provides another fine line position number to the logical AND circuits 486, 487, 488, 489, 490 and 491. When all of the fine comparisons have been made for a coarse position, then the central processing unit 85 provides the Coarse Line Mark Reset signal to reset the latch 483 and the counter 485. The coarse counter continues to count and the central processing unit 85 sends the coarse count for the next line to be line marked. The process just described repeats until all line positions requiring marking have been marked. This completes the detailed description for the first embodiment of the invention. The second embodiment of the invention will now be described in detail.

SECOND EMBODIMENT

The second embodiment of the invention is quite similar to the first embodiment except the binary one and zero bits for the document and line identification code are represented by two types of code bars of different thicknesses. Further, the coarse line position code is read after the beam has engaged the second bracket bar 43 and is reversed and directed downward toward the first bracket bar. In the first embodiment of the invention, the coarse position code is read after the first bracket bar is detected and while the beam is moving upwardly.

INITIAL DOCUMENT STOPPING

In connection with the second embodiment, the document 40 is stopped within the reading station in response to mark 56 on the document being detected by a detector 47. After the document has been stopped with a predetermined portion thereof within the scan window at the reading station, the beam of the cathode ray tube is positioned to a home position which corresponds to position 57 on the document. Initialization can take place in substantially the same manner as described for the first embodiment.

After initialization, the beam is directed from position 57 horizontally to the right until it engages field bar 55. Upon detection of field bar 55, the beam is directed upwardly to the left travelling at an angle so as to move out of the field bar 55. After having moved upwardly at an angle a predetermined distance, the beam is then directed vertically downward to move through the document code 50. In doing so, the beam first engages the bracket bar 51.

READING THE DOCUMENT CODE

After the beam engaged the field bar 55, signal Read Document Code is developed for setting code search latch 501. With the code search latch 501 set, singleshot multivibrators 502 and 503 are fired. The firing of singleshot multivibrators 502 and 503 develops signals therefrom for driving the beam upwardly and to the left. The output of the singleshot multivibrator 502 is connected to the beam deflection circuit to drive the beam to the left while the output of the singleshot multivibrator 503 is connected to the beam deflection circuitry to drive the beam upwardly.

The outputs of singleshot multivibrators 502 and 503 are also connected to inputs of inverters 504 and 505 respectively. The outputs of these inverters are connected to inputs of logical AND circuit 506 which also has an input connected to the set output of code search latch 501. The output of logical AND circuit 506 is connected to the beam deflection circuit for driving the beam vertically downward. Thus, when singleshot multivibrators 502 and 503 time out, the beam will be positioned out of the field bar 55 and then will be driven vertically downward to pass through the document code 50.

Singleshot multivibrator 502 also functions to reset the register for receiving the information in response to reading the document code. This is accomplished by connect- the output of the singleshot multivibrator 502 to an input of logical OR circuit 507 which has its output connected to an input of an inverter 508, the same having its output connected to an input of a logical AND circuit 509. Because of the inverter 508, the logical AND circuit 509 will be deconditioned at this time. The output of logical AND circuit 509 is connected to inputs of a logical AND circuit 511 and an inverter 510. The output of inverter 510 is connected to the reset input of the register reset latch 512 which has its reset output connected to an input of a logical OR circuit 513. The output of logical OR circuit 513 is connected to the reset input of the register 515 for receiving the binary information in response to reading the document code. The register 515 is an eight position binary trigger register. Thus it is seen that the singleshot multivibrator 502 also functions to reset the register 515.

Trigger T1 of register 515 has its set input connected to the set output of latch 520 which is set whenever the beam reads a twenty mil code bar 54 of the document code. The reset input of trigger T1 is connected to the output of a logical AND circuit 521 which has an input connected to the reset output of latch 520 and an input connected to the set output of latch 522 which is set whenever the beam reads a ten mil code bar 53 of the document code. Data is shifted within register 515 by means of a shift pulse conducted over line 523 which is connected on one end to each AC set input of the triggers forming register 515 and on its other end to the output of a logical AND circuit 525. Before discussing the inputs to logical AND circuits 525 which develops the shift pulse, the manner for developing the data to be entered into register 515 will first be described.

Digitized video data developed from the output signal of the photomultiplier tube is applied to logical AND circuit 511. Logical AND circuit 511 also has an input connected to the output of logical AND circuit 509 which had been deconditioned until singleshot multivibrator 502 timed out. Logical AND circuit 509 also has an input connected to the output of a logical OR circuit 526 which among other inputs has an input connected to the set output of a latch 527. Latch 527 has a set input connected to the set output of code search latch 501 and thus is set whenever latch 501 is set. It may be noted at this time that logical OR circuit 526 also has an input called "initialization" and a signal representing this condition is present after the document has been indexed and the line position identification of the last line read is to be found. Logical OR circuit 526 also has another input on which a signal is present when the beam is directed into the line identification track 46 for the purpose of identifying a particular line position.

Hence, with latch 527 set, logical AND circuit 509 is conditioned via logical OR circuit 526 whereby a signal is passed for conditioning logical AND circuit 511. The output of logical AND circuit 511 is connected to inputs of delays 528, 529, 530 and to an input of an inverter 531 which has its output connected to an input of a delay 532.

The delays 528, 529, 530 and 532 each produce an output if the input signal thereto is present for at least a predetermined time duration. More specifically, the delay 528 will have an output if its input signal is present for at last ten microseconds. Because of tolerances, the ten microseconds which in this particular example is equivalent to five mils because the beam is traveling five hundred inches per second, is indicative of detecting a ten mil bar 53. Similarly, delay 529 functions to indicate that a twenty mil code bar 54 has been detected. Delay 529 has an output whenever its input signal is present for at least twenty-eight-and-one-half microseconds. Delay 530 provides an indication when the beam detects a heavy bracket bar such as bars 51 and 52 for document code 50 and bars 42 and 43 for line identification track 41. Delay 530 has an output whenever its input has been present for at least sixty-four microseconds. The delay 532 functions to provide an indication when the beam is in white. When the beam is in white, the output of logical AND circuit 511 will be down; however, inverter 531 will provide an up input signal to delay 532 and if this input signal is present for at least twenty-six microseconds, a signal indicating that the beam is in white will be developed.

The outputs of delays 528, 529 and 530 are connected to set inputs of latches 522, 520 and 533 respectively. The output of delay 532 is connected to an input of a singleshot multivibrator 534 which has a period of two microseconds. It may be summarized at this time that the beam is moving downward and has engaged the bracket bar 51. Obviously, if the resultant video signal passed by logical AND circuit 500 is present for a sufficient time to set the latch 533, latches 520 and 522 will also be set. With latch 520 set, an input signal is made available to the register 515. However, this input signal is not entered into the register until a Shift In signal is developed by logical AND circuit 525. The Shift In signal developed by logical AND circuit 525 occurs after the beam has passed through bar 51 and is in white for a sufficient length of time for delay 532 to develop an output signal.

The output of delay 532 is connected to the input of singleshot multivibrator 534. The output of singleshot multivibrator 534 is connected to an input of a delay line 535 consisting of delays 536, 537 and 538. The output of singleshot multivibrator 534 is also connected to inputs of logical AND circuits 540 and 541. Logical AND circuit 540 will not be conditioned at this time because a latch 542 will not be set. Latch 542, as well be seen later herein, is set only after an indexing operation has taken place. However, logical AND circuit 541 will be conditioned during the first microsecond after singleshot multivibrator 534 has been fired. This is because logical AND circuit 541 also has an input connected to the output of an inverter 543 which has its input connected to the output of the one microsecond delay 536. The output of logical AND circuit 541 is connected to an input of logical OR circuit 544 which has its output connected to an input of logical AND circuit 525. Logical AND circuit 525 also has an input connected to the output of logical OR circuit 526 which will be passing a signal at this time. Also, logical AND circuit 525 has an input connected to the output of an inverter 546 which has its input connected to the output of a one-and-one-tenth microsecond delay 547.

Delay 547 has its input connected to the output of a logical AND circuit 548 which functions to determine whether or not a valid bit configuration has been entered into the register 515. A valid bit configuration exists when triggers T1 and T7 are ON and trigger T8 is OFF after all of the bits to be entered into the register 515 have been entered. In addition to requiring that a valid code be entered into the register 515, an odd number of bits must have been entered into the register 515. Whether or not an odd number of bits have been entered into register 515 is determined by trigger 550 which has its AC set input connected to the output of logical AND circuit 525. Its DC reset input is connected to the output of logical OR circuit 513. The set output of trigger 550 is connected to an input of logical AND circuit 548 which also has inputs connected to the set outputs of triggers T1 and T7 and the reset output of trigger T8 of the register 515.

It is thus seen that after the beam passes through the bar 51 into white and is in white for twenty-six microseconds, the singleshot multivibrator 534 is fired and logical AND circuit 541 passes a signal via logical OR circuit 544 and logical AND circuit 525 to the Shift In Input of the register 515 whereby a data bit furnished from latch 520 is entered into position one of the register 515, i.e., trigger T1 becomes set. With a bit having been entered into the register 515, it is necessary to reset the latches 520, 522 and 533 because the beam is still moving downward and these latches must be reset so that an indication may be had for identifying the next code bar to be read. The reset pulse is developed as the signal from the singleshot multivibrator 534 propagates through the delay line 535.

The output of delay 537 is connected to the input of an inverter 551 and to the input of delay 538. Inverter 551 has its output connected to an input of logical AND circuit 552 the same also having an input connected to the output of the one microsecond delay 538. The output of logical AND circuit 552 is connected to the reset inputs of latches 520, 522 and 533. It may be noted at this time that the output of logical AND circuit 552 is also connected to an input of a logical OR circuit 553 which has its output connected to the reset input of latch 542. Thus it is seen that after logical AND circuit 541 passes a shift pulse, logical AND circuit 552 passes a pulse for resetting the latches 520, 522 and 533.

In the example shown, the document code 50 starts with a ten mil code bar 53. Thus, as the beam reads this ten mil code bar 53, only the latch 522 is set. Hence, with latch 522 set and latch 520 reset, logical AND circuit 521 passes a signal to the gate of the reset input of trigger T1. Thereafter, as the beam moves out of the ten mil code bar 53 into white, a shift pulse will be developed as previously described and the state of trigger T1, which had been set, will be transferred to trigger T2 and trigger T1 becomes reset because of the signal provided by logical AND circuit 521. Additionally, the latches 520, 522 and 533 again become reset in the manner previously described. The beam continues moving downwardly and this time it engages a twenty mill code bar 54. Thus latches 520 and 522 become set; however, logical AND circuit 521 will not be conditioned because latch 520 is set. Further, with latch 520 set, the set input of trigger T1 is conditioned. Consequently, when the shift in pulse is developed, the states of triggers T1 and T2 are transferred to triggers T2 and T3 respectively and trigger T1 becomes set.

The reading of the document code 50 continues and after the document code has been read, there should be a one bit in positions one and seven of the register 515 in response to reading the bars 51 and 52. Therefore, if no error had occurred while entering the bits into the register 515, i.e., trigger T8 is OFF and trigger 550 has been set, then logical AND circuit 548 passes a signal to indicate that a valid code has been read and the document code reading operation should be terminated.

In order to terminate the document code reading operation, the output of logical AND circuit 548 is connected to the input of delay 547. The output of the delay 547 is connected to an input of logical AND circuit 555 which also has an input connected to the set output of the code search latch 501. The output of logical AND circuit 555 is connected to inputs of a singleshot multivibrator 556 and a delay 557. The output of singleshot multivibrator 556 is connected to an input of inverter 558, the same having its output connected to an input of logical AND circuit 559. The logical AND circuit 559 also has an input connected to the output of delay 557. Thus, when singleshot multivibrator 556 times out, logical AND circuit 559 passes a signal. The output of logical AND circuit 559 is connected to inputs of logical OR circuits 560 and 561. The output of logical OR circuit 560 is connected to the reset input of the code search latch 501. Thus, the code search latch 501 becomes reset shortly after the document code has been read. The beam at this time is approximately two hundred mils below the bar 52 because the code search latch 501 is not reset until the beam has traveled this distance which has in essence been determined by the singleshot multivibrator 556. The output of logical OR circuit 561 provides a signal for switching the operation into a Line Searching mode.

It should be noted that the document code which is residing in register 515 is transferred at this time to the central processing unit 700 or other utilization device which utilizes the document code information for either processing purposes or other control functions. The output of logical AND circuit 559 passes a signal to the central processing unit 700 or other utilization device to indicate that the document code has been read and is available in register 515. The central processing unit in response to receiving this signal from logical AND circuit 559 generates a signal for conditioning logical AND circuits 565, 566, 567, 568 and 569 which are connected to the set outputs of triggers T6, T5, T4, T3 and T2 of register 515 respectively. It should be recognized that the low order bit of the document code is in trigger T6 and the high order bit is in trigger T2. The outputs of logical AND circuits 565, 566, 567, 568 and 569 are connected to inputs of logical OR circuits 570, 571, 572, 573 and 574, respectively. The outputs of these logical OR circuits are connected to the input of the central processing unit 700. The other inputs to these logical OR circuits will be described shortly; however, suffice it to say at this time they also have inputs for receiving the course and fine measurements when a line position has been ascertained in response to reading a line position from the line identification track 41.

Now that the document code has been read and the information representing the code has been transferred to the central processing unit 700 and the operation is in a Line Searching mode, the beam rasters to the right in search of a line of information. After the beam has found a line of information it centers thereon and the height of the raster is normalized with respect to the character height. The raster height normalization continues until the beam reaches the right-hand edge of an information field. The operation then switches into a Character Identification mode and the beam rasters to the left reading the characters in that particular line. Thus, after the line has been read, the beam is adjacent to a field bar 46. Actually, the beam continues rastering into the field bar and after it has rastered within the field bar 46 a predetermined amount so as to provide a sufficient indication that it has detected field bar 46, the beam will either be down spaced in search of the next line to be read or if an error had occurred while reading the line of information or if the line read is the last line within the scan window, the beam will be directed into the line identification track 41. It will first be assumed that the beam has reached point 61 within code bar 46 and that an error has occurred while reading the line of information. Consequently, the beam will be directed into the line identification track 41. After having entered the line identification track 41, the beam is directed upwardly to develop the fine and coarse measurements respectively.

READING THE LINE IDENTIFICATION TRACK

After having read a line of information as determined by the beam reaching point 61 within the field bar 46, an End of Line signal is generated for setting the end of line latch 575. If an error had occurred while reading the line of information, the central processing unit 700, which is used during the character identification operation, provides a signal to logical OR circuit 576 to indicate that significant error had occurred. The output of logical OR circuit 576 is connected to an input of logical AND circuit 577 which also has an input connected to the set output of the end of line latch 575. Logical AND circuit 577 also has an input connected to the output of inverter 578 the same having an input connected to the output of singleshot multivibrator 579, which as it will be seen shortly, functions to drive the beam into the line identification track 41. Actually, the beam will be driven into the line identification track 41 before logical AND circuit 577 has an output.

The singleshot multivibrator 579 has its input connected to the output of a logical OR circuit 580 which has an input connected to the output of logical AND circuit 581 and to the set output of trigger 651. Logical AND circuit 581 has inputs connected to the set output of latch 575 and the output of logical OR circuit 576. Thus, it is seen that after the end of a line has been reached and if a significant error has occurred while reading that line, logical AND circuit 581 passes a signal via logical OR circuit 580 for firing singleshot multivibrator 579. The output of singleshot multivibrator 579 is also connected to an input of the beam deflection circuit for driving the beam horizontally to the left. It may be noted that had not the central processing unit 700 provided a signal to the logical OR circuit 576 before the end of line latch 575 had been set, then logical AND circuit 582 would pass a down space drive signal for directing the beam downwardly to the right and the operation then would switch into a Line Searching mode. Logical AND circuit 582 has inputs connected to the set output of the end of line latch 575 and to the output of an inverter 583 which has its input connected to the output of logical OR circuit 576.

The output of singleshot multivibrator 579 is also connected to an input of inverter 578 which has its output connected to an input of logical AND circuit 577. Hence, when singleshot multivibrator 579 times out, logical AND circuit 577 will pass a signal. The output of logical AND circuit 577 is connected to an input of logical OR circuit 526 which as it will be recalled has its output connected to an input of logical AND circuit 509 to condition the same. Logical AND circuit 509 thus conditions logical AND circuit 511 to permit the same to pass the digitized video signal. The output of the singleshot multivibrator 579 is also connected to an input of an inverter 585 which has its output connected to the AC set input of a trigger 586. Thus, when the singleshot multivibrator 579 times out, the trigger 586 is set.

The trigger 586 controls the movement of the beam in the upward direction after the beam has entered into the line identification track 41. The set output of the trigger 586 is connected to an input of a logical OR circuit 588 which has its output connected to an input of the beam deflection circuitry for driving the beam vertically upward. The set output of trigger 586 also conditions its AC reset input to thereby condition the trigger 586 for being reset. The set output of trigger 586 also is connected to an input of logical OR circuit 589 which has its output connected to an input of logical AND circuit 590. Logical AND circuit 590 also has an input connected to the output of a free-running clock 591 which furnishes the pulses for making the fine or vernier measurement as the beam moves upward within the line identification track 41 toward a first bracket bar 43. The output of logical AND circuit 590 is connected to the advance input of a five position binary counter 595 which counts the number of pulses furnished by clock 591. It is thus seen that trigger 586 conditions logical AND circuit 590 for passing the clock pulses to the counter 595.

While the clock pulses are being counted within counter 595, logical AND circuit 577 is providing a conditioning signal via logical OR circuit 526 to logical AND circuits 509 and 525. It will be recalled that logical AND circuit 509 provides a conditioning signal to logical AND circuit 511 to permit the same to pass the digitized video signal to the delays 528, 529, 530 and inverter 531. The register 515 will be held reset at this time because the latch 512 is in its reset state and this condition is passed via logical OR circuit 513 to hold the register 515 reset. However, since logical AND circuit 511 is conditioned at this time, the first encountered bracket bar 43 can be sensed and will be sensed when the beam has been therewithin at least sixty four microseconds whereby delay 530 passes a signal for setting latch 533. With latch 533 set, latch 512 becomes set and counter 600 for counting the number of bracket bars engaged by the beam during this operation is set to one.

The input of the bracket bar counter 600 is connected to the set output of the latch 533. The output of position one of the counter 600 is connected to an input of logical OR circuit 513 and therefore, the register 515 is still held in its reset condition even though latch 512 has been switched to its set state. Further, the output of position one is connected to the AC reset input of trigger 586 and thus causes this trigger to become reset. Therefore, with trigger 586 reset, logical AND circuit 590 is no longer conditioned and clock pulses cannot enter the fine code counter 595.

The reset output of trigger 586 is connected to condition its AC set input and is also connected to an input of a singleshot multivibrator 605 which has its output connected to inputs of logical AND circuits 606, 607, 608, 609 and 610. These logical AND circuits also have inputs connected to outputs of the five triggers forming the fine code counter 595. The outputs of logical AND circuits 606, 607, 608, 609 and 610 are connected to the set inputs of latches 611, 612, 613, 614 and 615 forming a buffer storage register 616 for storing the fine or vernier count developed within counter 595 as the beam traveled from its level of entry into the line identification code track 41 to the first bracket bar 43. The fine or vernier count or measurement stored in register 616 is then used for line identification purposes and for knowing when the beam has returned to its original level of entry into the line identification track 41. Hence, the signal from singleshot multivibrator 605 is also passed to the central processing unit 700 or other storage device for indicating that the fine or vernier measurement is available. The central processing unit 700 or other storage device then sends a signal for conditioning logical AND circuits 620, 621, 622, 623 and 624 which have their other inputs connected to the set outputs of latches 611, 612, 613, 614 and 615 respectively.

It should be noted that the output of position one of the counter 600 is also connected to an input of logical OR circuit 588 and thus the beam continues moving upwardly at this time. Since the logical AND circuit 511 is still conditioned by the output of logical AND circuit 509, the digitized video signal is passed to delays 528, 529 and 530. Thus, when the beam engages the second bracket bar 43, the counter 600 will again be advanced and thus position two thereof will become active. The output of position two of counter 600 is connected to an input of logical OR circuit 625. The output of logical OR circuit 625 is connected to the beam deflection circuitry for driving the beam vertically downward. Thus the beam reverses its direction of motion within the second bracket bar 43 and starts downward. It should be noted that since the output of position one is no longer active, logical OR circuit 513 will not be receiving a signal on any of its inputs at this time and thus register 515 will no longer be held reset.

After the beam leaves the second bracket bar 43 and enters into white during its downward travel, there is an output from delay 532 and latch 533 becomes reset in the manner indicated when describing the reading of the document code. The binary code bars 44 and 45 for representing the binary number of the particular incremental area are read in the same manner that the binary code bars 53 and 54 are read for the document code. The information resulting from reading the binary code bars 44 and 45 is entered into the register 515. After the beam has read the code bars 44 and 45, it will engage another bracket bar 43 and the counter 600 will be advanced to position three. This bracket bar 43 is the same bracket bar that the beam first engaged while moving vertically upward. The output of position three of counter 600 is connected to inputs of logical OR circuits 625 and 626. The output of logical OR circuits 625 of course causes the beam to continue to move vertically downward and the output of logical OR circuit 626 is connected to the set input of a latch 627. The output of position three of counter 600 is also connected to an input of a logical AND circuit 628 which also has an input connected to the output of delay 527 indicating that the value in register 515 can be transferred to the central processing unit 700 or other storage device. The output of logical AND circuit 628 is connected to an input of the central processing unit 700 to indicate that the coarse measurement in register 515 is available for storage. The central processing unit 700 or other storage device after receiving a signal from logical AND circuit 628 then provides a signal for conditioning logical AND circuits 565, 566, 567, 568 and 569 whereby the information in register 515 is transferred to the central processing unit.

The set output of the latch 627 is connected to an input of logical OR circuit 589 which, as it will be recalled, has its output connected to condition logical AND circuit 590 whereby clock pulses from clock 591 are passed to the counter 595. The set output of the latch 627 is also connected to an input of a logical AND circuit 630 whose function as it will be seen shortly, is to permit the beam to be down spaced out of the line identification track 41 to a position for searching for the next line of information.

At this time, it is necessary to return the beam to the same level it had upon entry into the line identification track 41. Accordingly, clock pulses will be entered into counter 595 and when the same number of clock pulses are entered into this counter as had been previously entered for developing the fine or vernier measurement, the beam will have returned to the original level it had upon entry into the line identification track.

In order to facilitate this comparison, the counter 595 is preset with the complement of the fine or vernier measurement stored in the latch register 616. This is accomplished by connecting the reset outputs of latches 611, 612, 613, 614 and 615 to inputs of logical AND circuits 631, 632, 633, 634 and 635 respectively. These logical AND circuits are conditioned when the bracket bar counter 600 has a value of two because the output from position two thereof is connected to an input of logical OR circuit 636 which has its output connected to inputs of the logical AND circuit 631, 632, 633, 634 and 635. The outputs of these logical AND circuits are connected to the DC set inputs of the five triggers forming the counter 595. It should be noted that the counter 595 was reset prior to receiving the complement from the register 616 as bracket bar counter 600 reached the value of two. The set output of latch 533 is connected to an input of logical AND circuit 637 which also has an input connected to the output of position two of the bracket bar counter 600. The output of logical AND circuit 637 is connected to an input of a logical OR circuit 638 which has its output connected to the DC reset inputs of the triggers forming the counter 595. Since the bracket bar counter 600 will have an output from position two thereof for the entire time that the beam is moving vertically downward from the second bracket bar 43 and in the meantime latch 533 becomes reset, then counter 595 is first reset and thereafter the complement of the fine or vernier measurement in register 616 is entered into counter 595. Further, when the bracket bar counter 600 reaches a count of three, clock pulses can be entered into the counter 595.

The number of clock pulses entered into counter 595 at this time will equal the number of clock pulses previously entered into counter 595 while making the fine or vernier measurement when counter 595 reaches a value of thirty one. This is detected by means of logical AND circuit 640 which has inputs connected to the set outputs of the five triggers forming the counter 595. The output of logical AND circuit 640 is connected to an input of logical AND circuit 630. It will be recalled that logical AND circuit 630 is conditioned by the set output of the latch 627 which is set at this time. The output of logical AND circuit 630 is connected to an input of logical OR circuit 641 which has its output connected to the input of singleshot multivibrator 642. The output of singleshot multivibrator 642 is connected to inputs of the beam deflection circuitry for driving the beam horizontally to the right vertically downward. Thus, the beam will be directed out of the line identification track 41 at an angle downward to the right a predetermined amount as determined by the period of the singleshot multivibrator 642. The operation then switches into a Line Search mode and latch 627 becomes reset.

The reset output of latch 627 is connected to an input of a logical AND circuit 643 which also has an input connected to the output of an inverter 644. The output of the logical AND circuit 643 is connected to an input of logical OR circuit 638 which, as it will be recalled, has its output connected to the DC reset inputs of the triggers forming the counter 595. Thus, counter 595 becomes reset when logical AND circuit 643 passes a signal indicating that the line identification operation is completed. The inverter 644 has its input connected to the set output of the latch 575. Thus, when latch 575 becomes reset, logical AND circuit 643 will be conditioned. Latch 575 has its reset input connected to the output of a logical AND circuit 645. Logical AND circuit 645 has an input connected to the output of an inverter 646 which has its input connected to receive the Read Initial Position signal. Logical AND circuit 645 also has an input connected to the output of a singleshot multivibrator 647 which has its input connected to the output of inverter 648, the same having its input connected to the output of singleshot multivibrator 642. Hence, when singleshot multivibrator 642 times out and if the operation is not in the Read Initial Position mode, then as singleshot mutivibrator 647 fires, logical AND circuit 645 passes a signal for resetting latch 575 and the operation switches into a Line Search mode.

From the immediate foregoing, it is seen that when an error occurred while reading a line of information, then after that line of information has been read, the beam is directed into the line identification track 41. The beam is then directed upward and the fine or vernier measurement is made as the beam travels from its initial level of entry into the line identification track 41, to the first bracket bar 43. The fine or vernier measurement is then stored and transferred to the central processing unit 700. The beam continues in its upward motion until it engages the second bracket bar 43 and travels therewithin a sufficient distance to indicate that the second bracket bar has in fact been detected. Thereafter, the vertical motion of the beam is reversed and the beam moves vertically downward. During its vertical downward movement, the coarse measurement is made by reading the binary code bars 44 and 45. This coarse measurement is transferred to the central processing unit 700 or other storage device so as to be available together with the fine or vernier measurement which is already in storage for a line marking operation. The termination of the coarse measurement operation takes place when the first engaged bracket bar 43 has been detected for a second time and in this instance while the beam is moving vertically downward. The beam continues to move vertically downward a distance equal to the vernier measurement. Thereafter, the beam is directed downwardly to the right in a down space operation so as to be positioned out of the line identification track and in a position to begin searching for the next line. The operation then switches into a line search mode. An incidental, but important, detail is the fact that the first bracket bar encountered in line identification mode must be scanned and identified both when the beam is traveling upward and downward. Since the position of the beam is not the same for both identifications, a constant correction must be made to account for this. This is done by apparatus not shown for moving the beam upwardly a constant distance equal to the negative of the error, at the end of each code reading operation such as after the beam has been down spaced.

DOCUMENT INDEXING

Document indexing takes place when the beam reaches the lower boundary of the scan window which is a short distance above the physical boundary of the window. This may occur during any one of three conditions. It may occur while searching for a line of information, or while centering upon a line of information, or while reading a line of information. In any event, when it does occur, the line position at that time is identified by directing the beam into the line identification track and fine and coarse measurements are made in a manner as previously described. The document is then indexed a fixed distance. During the indexing operation, the beam is deflected in an aging mode. After the indexing operation has been completed, the beam is directed to its home position. With the beam in its home position, the new scan window latch 650 is set. Thereafter, the beam is directed to the left until it engages field bar 46.

The set output of the latch 650 is connected to condition the AC set input of trigger 651. The set output of latch 650 is also connected to an input of the beam deflection circuitry for driving the beam horizontally to the left. When the beam engages field bar 46, a Field Bar signal is developed and this signal is applied to the set input of trigger 651 to set the same and to the reset inputs of latches 527 and 650. The set output of trigger 651 is connected to an input of logical OR circuit 580 which as it will be recalled has its output connected to the input of singleshot multivibrator 579. Thus singleshot multivibrator 579 is fired at this time and the beam continues to move to the left a predetermined amount as determined by the period of the singleshot multivibrator 579. The set output of trigger 651 is also connected to the input of singleshot multivibrator 655 which has its output connected to the input of inverter 656 and to an input of the beam deflection circuitry for driving the beam vertically upward. Hence, the beam is driven upwardly to the left so as to be properly positioned within the code track 41. Further, by driving the beam upwardly, it becomes positioned to its highest point within the scan window, and accordingly it can read all of the line position identification track 41 within the scan window to find the identification of the last line within the scan window prior to indexing.

The output of the inverter 656 is connected to an input of logical AND circuit 657 which also has an input connected to the set output of trigger 651 and an input connected to the output of inverter 658. The input of inverter 658 is connected to the output of singleshot multivibrator 579. Therefore, it is seen that during the time singleshot multivibrators 579 and 655 are ON, the logical AND circuit 657 is inhibited from passing a signal. However, when singleshot multivibrators 579 and 655 time out, logical AND circuit 657 passes a signal to logical OR circuit 526. It will be recalled that the output of logical OR circuit 526 conditions logical AND circuits 509 and 525. This in effect, permits the reading of the line identification track 41 as the beam is deflected vertically downward.

The output of logical AND circuit 657 is also connected to an input of the beam deflection circuitry for driving the beam vertically downward. Initially, for this particular example, in order to relocate the last line read, only the coarse measurement is made. Hence, as the beam moves through the line identification track 41, the binary numbers representing the incremental areas are entered into register 515. Each binary number entered into register 515 is compared with the coarse measurement for the last line read. This coarse measurement for the last line read had been stored in latches 660, 661, 662, 663 and 665 after having transferred thereto from register 515 via logical AND circuits 666, 667, 668, 669 and 670. These logical AND circuits are conditioned by a signal indicating that the last line within the scan window has been properly identified. This conditioning signal is passed by logical AND circuit 695 which has inputs connected to the output of delay 693 and to receive the Read Initial Position signal. Delay 693 has its input connected to the output of delay 547. Hence, logical AND circuits 666, 667, 668, 669 and 670 are not conditioned until after a valid course code has been read into register 515 as determined by logical AND circuit 548. Further, prior to these logical AND circuits being conditioned, the latches 660, 661, 662, 663 and 664 are reset by a signal passed by logical AND circuit 696. The logical AND circuit 696 has inputs connected to the output of inverter 694, the output of delay 547 and to receive the Read Initial Position signal. Inverter 694 has its input connected to the output of delay 693.

Thus, the present coarse count in the register 515 as the beam reads the line identification track 41 is compared with the coarse measurement for the last line read stored in the latches 660, 661, 662, 663 and 664. The set and reset outputs of trigger T2 of register 515 are compared with the set and reset outputs of latch 660 by means of logical AND circuits 671 and 672 respectively. The outputs of logical AND circuits 671 and 672 are connected to inputs of logical OR circuit 681 which has its output connected to an input of logical AND circuit 686. The set and reset outputs of the other triggers of register 515 for representing the coarse measurement are similarly compared with the other latches storing the coarse measurement for the last line read. The logical AND circuits which perform comparisons in the same manner that logical AND circuits 671 and 672 make comparisons have their outputs connected to inputs of logical OR circuits and the outputs of these logical OR circuits are connected to inputs of logical AND circuit 686.

The output of logical AND circuit 686 is connected to the input of inverter 687 and to an input of logical AND circuit 688. The output of the inverter 687 is connected to an input of logical AND circuit 689. Logical AND circuits 688 and 689 also have inputs connected to the output of logical AND circuit 690 to be conditioned when a signal is passed therefrom. Logical AND circuits 688 and 689 function to provide an indication when the comparison between the present coarse measurement in register 515 compares equal or unequal, respectively, with the coarse measurement of the last line read. Logical AND circuit 690 provides a gating signal to logical AND circuits 688 and 689 during the comparison operation. Logical AND circuit 690 has an input connected to the output of delay 547 and an input connected to the output of logical AND circuit 657. Hence, logical AND circuit 690 will pass a signal after a valid code has been entered into register 515 when in the initialization mode.

The output of logical AND circuit 688 is connected to the input of singleshot multivibrator 691 which has its output connected to inputs of logical OR circuits 626 and 636. By this arrangement, when there is an equal comparison between the stored coarse measurement for the last line read and the present coarse measurement, the fine measurement stored for the last line read is transferred from the latches 611, 612, 613, 614 and 615 in complement form to the counter 595. The clock pulses from clock 591 are passed by logical AND circuit 590 to the counter 595 and as previously indicated when this counter reaches a value of thirty one, logical AND circuit 640 passes a signal indicating that the beam can be driven out of the line identification track. The particular manner in which the beam is driven out of the line identification track can be either a down space operation which drives the beam downwardly at an angle to the right or the beam can be driven horizontally to the right. A down space operation takes place if the last line in fact had been read at the time the beam reached the lower edge of the scan window prior to indexing and the beam is driven horizontally to the right out of the line identification track 41 if the beam were not reading a line of information at the time it reached the lower edge of the scan window. This condition results if at the time the beam reached the bottom of the scan window it had not yet encountered any character data in its latest search or if it had encountered data but had not yet line centered on the data.

If an unequal comparison results, the beam continues moving downwardly through the line identification track and a new coarse measurement is entered into the register 515. The output of logical AND circuit 689 is connected to the set input of latch 542. The set output of latch 542 is connected to inputs of logical AND circuits 540 and 692. It will be recalled that logical AND circuit 540 also has an input connected to the output of logical AND circuit 509 and an input connected to the output of delay 536. The delay 536 will have an output approximately one microsecond after the beam has entered into white. Accordingly, all the inputs to logical AND circuit 540 will be satisfied when there is an output from delay 536. The output of logical AND circuit 540 is connected to an input of logical OR circuit 513. Hence, the register 515 will be reset when logical AND circuit 540 passes a signal. Logical AND circuit 692 has another input connected to the output of delay 538. The output of logical AND circuit 692 is connected to an input of logical OR circuit 544 which as it will be recalled passes a shift pulse for shifting the data within register 515. The latch 533 for representing that a bracket bar 43 had been detected will be in its set state at this time as well as latches 520 and 522 because logical AND circuit 552 has not passed a pulse for resetting these latches. Consequently, when the logical AND circuit 692 passes a shift pulse, a binary one bit is entered into the register 515. One microsecond later, logical AND circuit 552 passes the pulse for resetting the latches 520, 522 and 533.

The beam is still moving in white; however, the indication of having detected the bracket bar 43 which is the last bracket bar detected during the previous coarse measurement has now been entered into the register 515 and therefore, the code representing the binary number for the next incremental area can be read into the register 515. After the code has been read and entered into register 515, another comparison takes place. If the comparison is equal, then the operation continues in the manner as previously indicated. In other words, the beam continues to move downwardly an amount equal to the vernier measurement stored for the last line read and thereafter the beam is directed out of the line identification track. If the comparison is still unequal, then the operation continues in the manner just described whereby latch 542 is again set and register 515 becomes reset. Thereafter, the coarse measurement for the next incremental area is entered into register 515. The binary codes for successive incremental areas would be read and compared with the coarse measurement in the latches 660, 661, 662, 663 and 664 until an equal comparison is obtained.

LINE MARKING

The line marking operation for the second embodiment is very similar to that for the first embodiment and therefore the additional apparatus required in the second embodiment for this operation is not shown. It should be realized that the line marking operation can take place while another document is being read within the reading station. Therefore, as the bracket bars 42 and 43 are being read by a sensor similar to sensor 38 of the first embodiment, the pulses developed in response to reading the bracket bars 42 and 43 are entered into a counter, not shown. The value in this counter is continuously compared with the value representing the coarse measurement of the line to be marked. This comparison would be very similar to the comparison of the coarse measurement of the last line read with the coarse measurement entered into register 515. When there is comparison between the value in the counter and the value of the coarse measurement for the first line to be marked, clock pulses related to the document speed are entered into a fine code counter, not shown, similar to counter 595. The fine measurement for the first line to be marked is transferred from storage to a register very similar to register 616. The fine measurement being made as the clock pulses are entered into the counter similar to counter 595 are then compared with the value in the register similar to register 616. When an equal comparison results, then this signal is used to actuate the line marking device which would then place a mark alongside the line in error.

From the foregoing, it is seen that the invention provides apparatus for identifying lines of information on documents to facilitate document indexing and line marking. It is seen that line identification takes place through the facility of a line identification track which divides the document into a number of incremental areas. Each incremental area is then identified by means of a printed binary code. In one instance, the presence and absence of code bars are used to represent the binary numbers. In another instance, the binary 1 and zero bits are represented by code bars of different thicknesses. In addition to dividing the document into a number of incremental areas, a fine measurement is made within an incremental area, whereby each line position is defined in terms of fine and coarse positions.

It is also seen that the types of documents are identified by a binary code preprinted upon the documents at a predetermined position with respect to the home position of the beam of the cathode ray tube for reading the documents. Of course, it is noted that it is not necessary to have the line identification track preprinted upon the documents. Both the line identification track and document code can be inscribed or preprinted upon a belt or plate which is referenced to the document while it is in the reading station. Different plates or belts would then be used for the different types of documents. In some instances it would be desirable to have the document code preprinted upon the documents, while the line identification track is contained upon a belt or plate referenced to the document in the read station.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Line identification apparatus for randomly identifying the positions of lines of information comprising:
- a line identification code track referenceable to any document and having upper and lower bracket marks to divide the document into a number of discrete incremental areas, said code track including code marks between said bracket marks to facilitate independent identification of each said discrete incremental area;
- means for making a fine line identification measurement by measuring the distance the line of information to be identified is away from the incremental area disposed above said lower bracket; and
- means for making a coarse line identification measurement by reading said code marks within the incremental area above said lower bracket whereby said line is identified in terms of said fine and coarse measurements.

2. The line identification apparatus of claim 1 wherein said fine measurement is in terms of digital data developed on a time basis and said code marks within said incremental areas represent data according to a binary code.

3. The line identification apparatus of claim 2 wherein said code marks within said incremental areas are of equal width and ordered therewithin according to said binary code.

4. The line identification apparatus of claim 2 wherein said code marks within said incremental areas represent data according to a binary code with a code mark of one line width representing a binary zero and a code mark of another line width representing a binary one.

5. Line identification apparatus for randomly identifying the positions of information on a document comprising:
- a line identification code track referenceable to any document and having upper and lower bracket marks to divide the same into a number of discrete incremental areas, said code track including code marks between said bracket marks to facilitate independent identification of each said discrete incremental area;
- positionable sensing means for sensing said bracket and code marks;
- control means for controlling the movement of said positionable sensing means including means for directing said sensing means into and out of said line identification track and means for moving said sensing means within said line identification track; and
- means for generating data in direct relationship to the distance said sensing means moves from the point of entry within said code track to the lower bracket mark of the incremental area immediately above.

6. Line identification apparatus for randomly identifying lines of information on a document comprising:
- a line identification track having upper and lower bracket bars for dividing a document into a plurality of incremental areas and including code marks between said bracket bars;
- means for sensing said bracket bars and code marks therebetween for discretely identifying each incremental area in terms of digital data; and
- means for generating data representing the vertical distance any line of information on said document is away from the lower bracket bar of the above adjacent incremental area whereby each line position is identified in terms of one of said identified incremental areas and generated data.

7. Line identification apparatus for randomly identifying the positions of lines of information on a document comprising:
- a line identification code track referenceable to any document and having upper and lower bracket marks to divide the same into a number of discrete incremental areas, said code track including code marks between said bracket marks to facilitate independent identification of each said discrete incremental area;
- positionable sensing means for sensing said bracket and code marks and generating signals in response to sensing said marks;
- control means for controlling movement of said positionable sensing means into and out of said line identification track and means for moving said sensing means within said line identification track;
- means for generating data in direct relationship to the distance said sensing means moves from the point of entry within said line identification track to the lower bracket mark of the incremental area immediately above said point of entry; and
- register means connected to receive data from said sensing means and said data generating means to represent a line position in terms of an incremental area and generated data.

8. A line marking system comprising:
- first identifying means for identifying positions of lines of information on a document to be marked in terms of coarse and fine data, said document being divided into a number of discrete incremental areas by upper and lower bracket marks with code marks between said bracket marks to facilitate independent identification of each discrete incremental area, said coarse data being in terms of said code marks within the incremental area above said lower bracket, and said fine data being in terms of the distance a line of information is away from the incremental area disposed above said lower bracket bar;
- storage means connected to receive said coarse and fine data for each line of information to be marked;
- second identifying means for identifying in sequence each line position in terms of coarse data;
- first comparing means connected to said storage means and to said second identifying means for comparing coarse data from storage with coarse data from said second identifying means and generating a signal upon an equal comparison;
- data generating means connected to said first comparing means to be rendered operative thereby upon an equal comparison to generate fine data;
- second comparing means connected to said storage means and to said data generating means for comparing fine data from storage with fine data generated by said data generating means and generating a signal upon an equal comparison; and line marking means connected to said second comparing means to be rendered operable upon the same generating a signal in response to an equal comparison.

9. The line marking system of claim 8 wherein said coarse and fine data is in digital form.

10. The line marking system of claim 8 wherein said data generating means continues to generate fine data until said second identifying means provides new coarse data to said first comparing means to enable several fine data comparisons to take place for each coarse data comparison.

11. A line marking system comprising:

a line identification code track referenceable to any document containing lines of information to be marked and having a plurality of vertically spaced bracket bars for dividing the document into a number of discrete incremental areas and code bars positioned between said bracket bars to facilitate independent identification of each discrete incremental area;

positionable sensing means for sensing said code marks within said line identification track;

control means for controlling the movement of said positionable sensing means including means for directing said sensing means into and out of said line identification track and means for moving said sensing means within said line identification track;

first fine data generating means for generating fine data in direct relationship to the distance said sensing means moves from the point of entry within said code track to the bracket bar immediately above;

means for representing data generated in response to said sensing means sensing code marks within the incremental area adjacent to said immediately above bracket bar as coarse data;

storage means for storing fine and coarse data for each line identified;

a selectively operable marking means located in a fixed position;

bracket bar sensing means located in a fixed position relative to said marking means;

counting means connected to said bracket bar sensing means to provide coarse data indications for each bracket bar sensed;

first comparing means connected to said storage means and said counting means for comparing coarse data within said storage means with coarse data from said counting means and generating a signal upon equal comparison;

second fine data generating means connected to said first comparing means to be operated by the signal generated thereby upon an equal comparison to generate fine data;

second comparing means for comparing the fine data generated by said fine data generating means with fine data in storage and generating a signal upon equal comparison; and means connecting said second comparing means to said line marking means to operate the same upon generation of a signal in response to an equal comparison.

12. The line marking system of claim 11 wherein said second fine data generating means continues to generate fine data until said second identifying means provides new coarse data to said first comparing means to enable several fine data comparisons to take place for each coarse data comparison.

13. In a document positioning system including a document transport:

a document positioning track referenceable to a document and having at least one sensible mark within said track;

sensing means positioned to sense said sensible mark within said track to generate a first stop signal for stopping the document transport;

a line identification code track referenceable to said document to divide the same into a number of discrete incremental areas, said code track including code marks to facilitate identification of each discrete incremental area;

means for defining stopping positions for said document transport in terms of said incremental areas;

means for identifying each of said incremental areas as a document is transported; and means for generating other stop signals for said document transport when identified incremental areas are the same as said defined stopping positions.

References Cited

UNITED STATES PATENTS

| | | | |
|---|---|---|---|
| 2,224,646 | 12/1940 | Friedman et al. | 340—146.3 XR |
| 2,518,694 | 8/1950 | Jannopoulo | 235—61.115 XR |
| 3,106,706 | 10/1963 | Kolanowski et al. | 340—146.3 XR |
| 3,283,303 | 11/1966 | Cerf. | |
| 3,337,766 | 8/1967 | Malaby | 340—146.3 XR |
| 3,342,978 | 9/1967 | Cameron et al. | 340—146.3 XR |
| 3,309,667 | 3/1967 | Feissel et al. | 340—146.3 |

MAYNARD R. WILBUR, Primary Examiner

SOL SHEINBEIN, Assistant Examiner

U.S. Cl. X.R.

235—61.11